(12) United States Patent
Usui et al.

(10) Patent No.: US 6,491,140 B2
(45) Date of Patent: Dec. 10, 2002

(54) ELECTRIC DISC BRAKE

(75) Inventors: Takuya Usui, Kanagawa-ken (JP); Yukio Ohtani, Kanagawa-ken (JP)

(73) Assignee: Tokico, Ltd., Kanagawa-ken (JP)

( * ) Notice: Subject to any disclaimer, the term of this patent is extended or adjusted under 35 U.S.C. 154(b) by 0 days.

(21) Appl. No.: 09/808,021

(22) Filed: Mar. 15, 2001

(65) Prior Publication Data
US 2001/0023798 A1 Sep. 27, 2001

(30) Foreign Application Priority Data

Mar. 15, 2000 (JP) .................................... 2000-072981
May 31, 2000 (JP) .................................... 2000-163074

(51) Int. Cl.[7] .............................................. F16D 55/08
(52) U.S. Cl. ....................... 188/72.1; 188/158; 188/162
(58) Field of Search ............................... 188/72.1, 71.7, 188/71.8, 72.2, 72.3, 72.7, 158, 159, 162, 196 R

(56) References Cited

U.S. PATENT DOCUMENTS 5,971,110 A * 10/1999 Martin ........................ 188/158
6,279,691 B1 * 8/2001 Takahashi et al. ...... 188/1.11 E
6,325,182 B1 * 12/2001 Yamaguchi et al. ........ 188/162

FOREIGN PATENT DOCUMENTS

| JP | 2001-240325 | * | 2/2001 |
| WO | WO 99/02885 | * | 1/1999 |
| WO | 00/60255 | | 10/2000 |

* cited by examiner

Primary Examiner—Pam Rodriguez
(74) Attorney, Agent, or Firm—Wenderoth, Lind & Ponack, L.L.P.

(57) ABSTRACT

In an electric disc brake a stator and a rotor of an electric motor are disposed in a caliper body, and a rotation of the rotor is converted into a linear movement by a ball-ramp mechanism. Such linear movement is transmitted to a piston, so that brake pads are urged against a disc rotor by the piston and a pawl member. Two external gears are provided on the rotor and internal gears are provided on two discs of the ball-ramp mechanism so that, due to engagement between the external gears and the internal gears, the two discs of the ball-ramp mechanism are rotated with a given rotational ratio with respect to the rotor to cause differential movement which in turn causes one of the discs to shift, thereby advancing the piston.

12 Claims, 16 Drawing Sheets

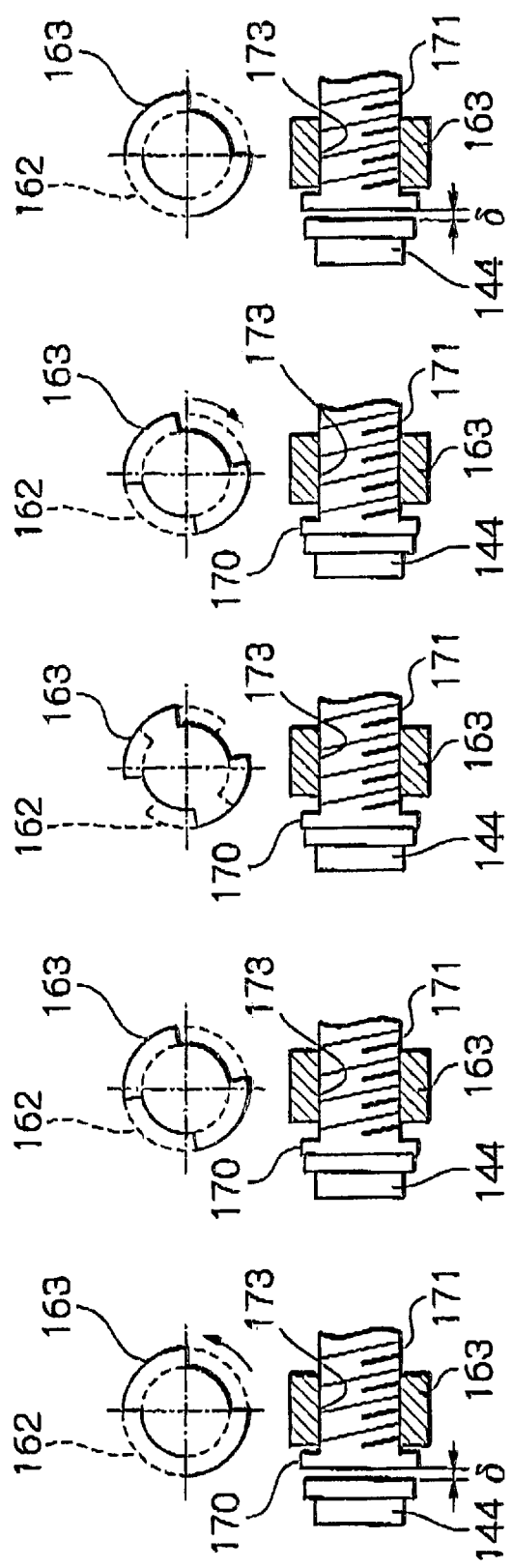

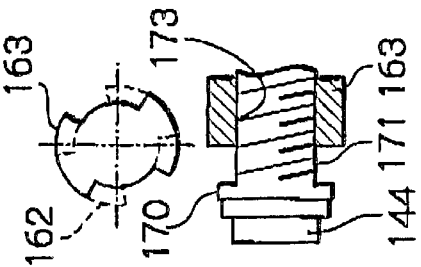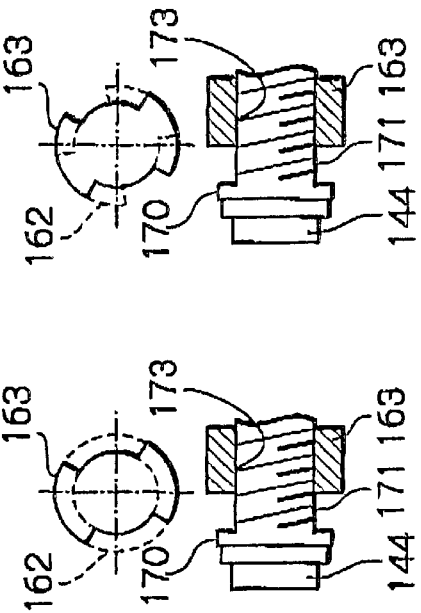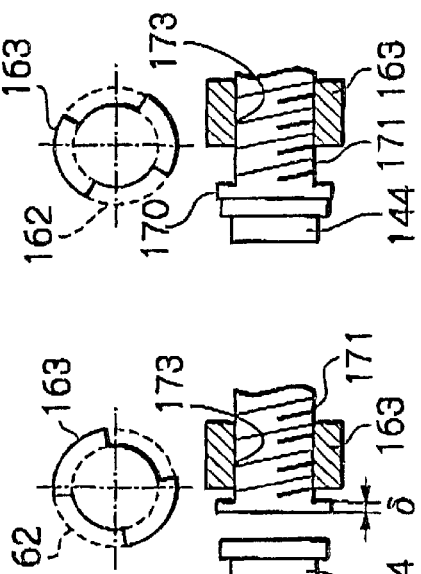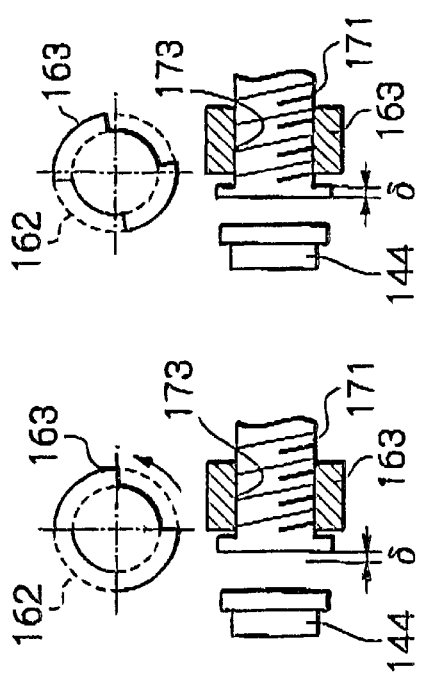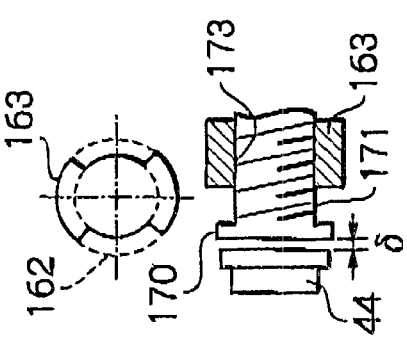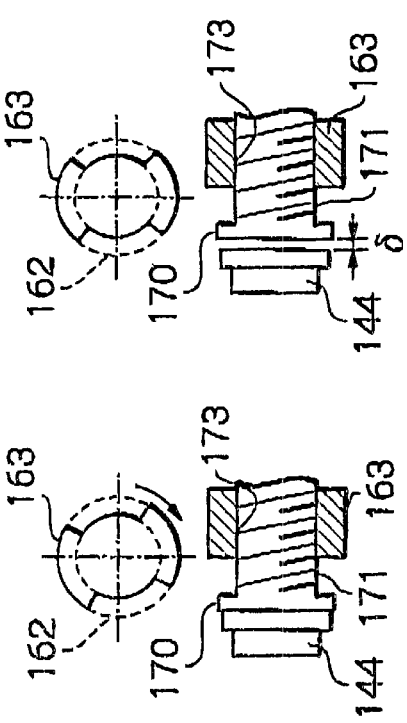

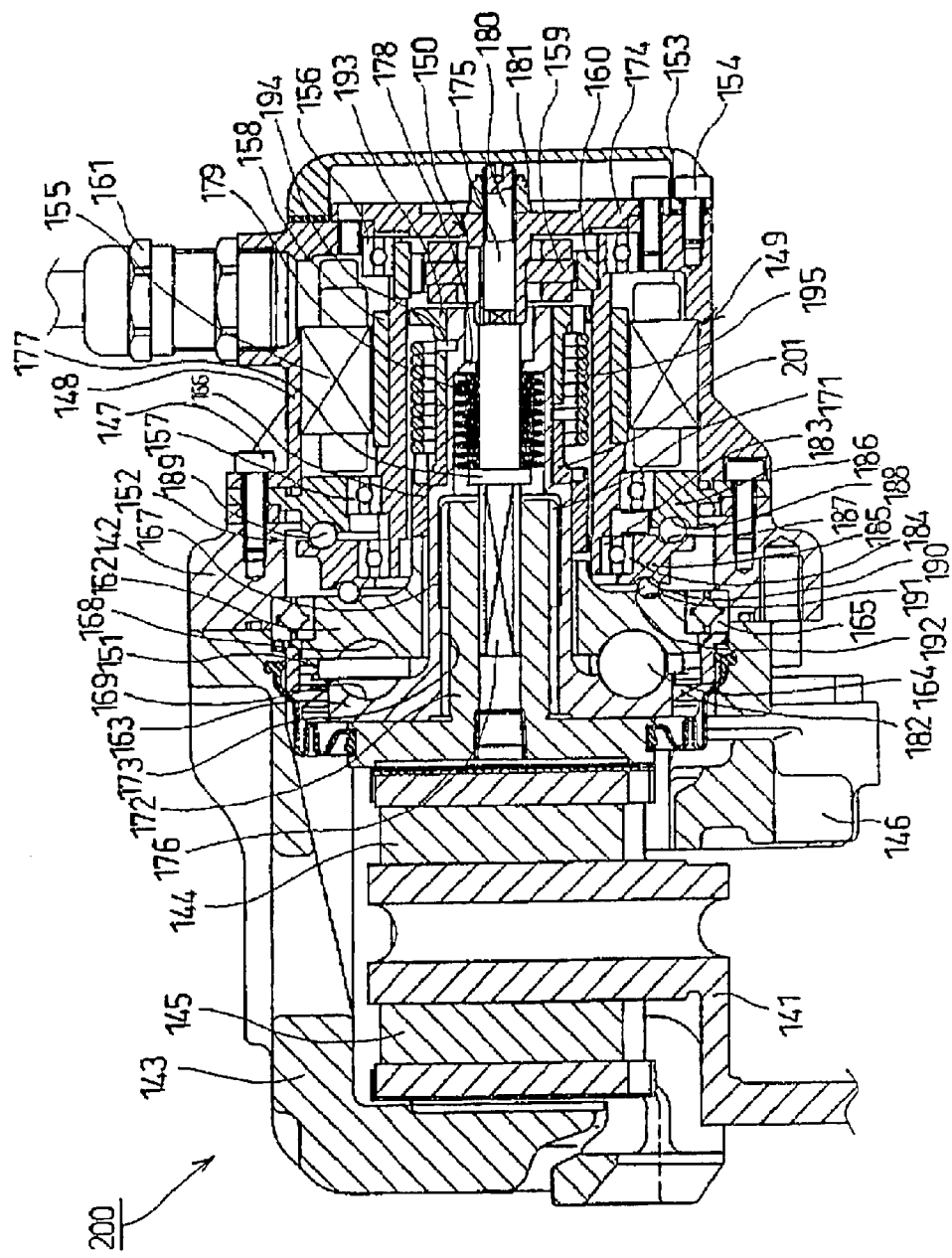

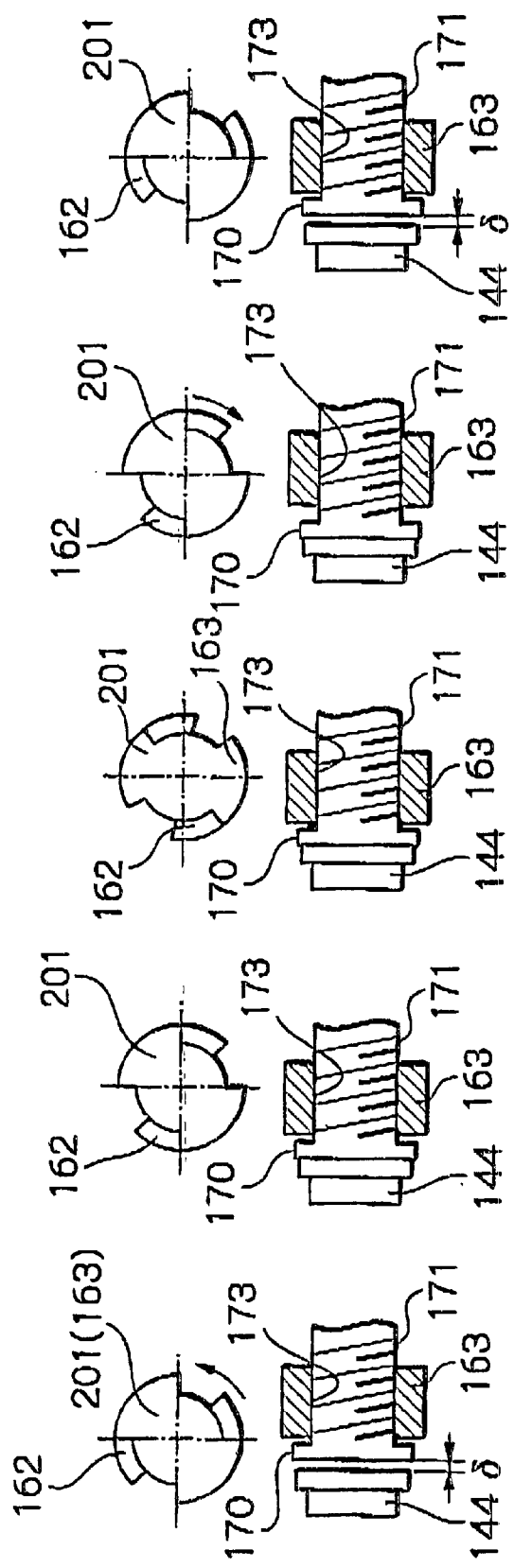

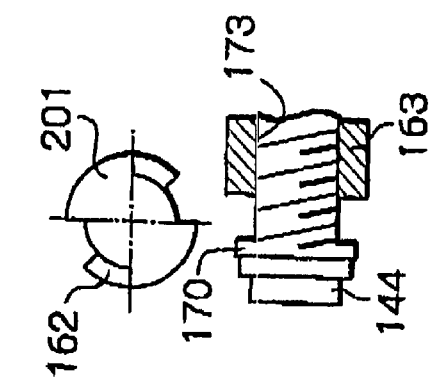
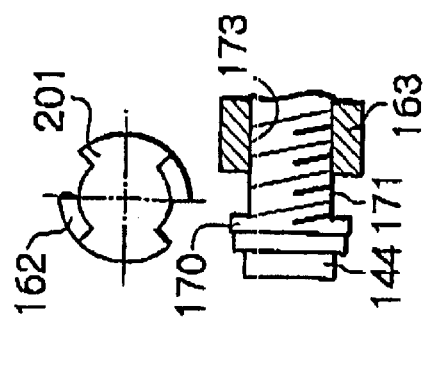
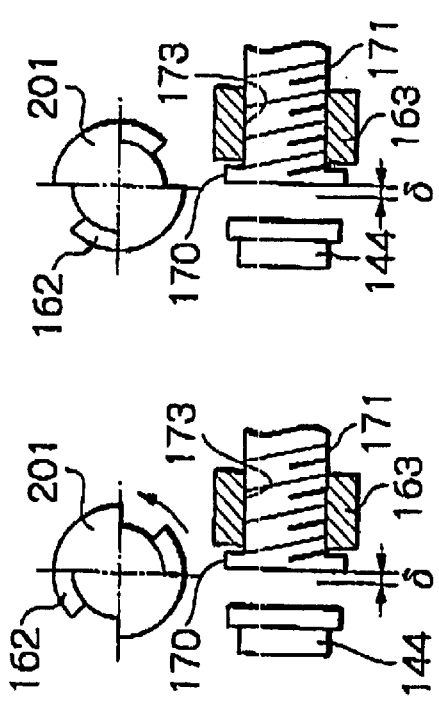
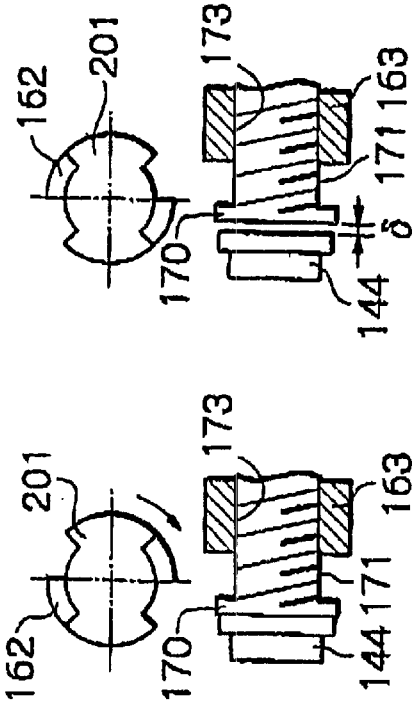

ELECTRIC DISC BRAKE

BACKGROUND OF THE INVENTION

The present invention relates to an electrically-driven disc brake for generating a braking force by a rotational force of an electric motor.

Among such disc brakes, There is an electric disc brake in which a caliper body is floatingly supported by a carrier secured to a non-rotating portion of a vehicle, and the caliper body is provided with a piston opposed to one of a pair of brake pads supported by the carrier on both sides of a disc rotor, an electric motor, and a motion converting mechanism for converting rotation of a rotor of the electric motor into a linear movement and for transmitting such movement to the piston. In such an electric disc brake, when an operator depresses a brake pedal, a force acting on the brake pedal (or displacement amount) is detected by a sensor, and the rotation of the electric motor is controlled by a controller on the basis of a detection result to obtain a desired braking force.

A ball-screw mechanism or a ball-ramp mechanism has been mainly used as the motion converting mechanism for converting the rotation of a rotor of an electric motor into the linear movement and for transmitting such movement to a piston since they can provide large thrust or braking force. However in conventional electric disc brakes, There has been no special speed reduction mechanism between the electric motor and the motion converting mechanism. Therefore, motor torque, thence, a motor body is made large and thus the caliper body itself also made bulky, thereby worsening installation capability onto the vehicle.

In some cases, the speed of the rotation of a motor is decreased by using a planetary gear and the rotation is converted into a linear movement by a precise roller-screw mechanism to generate a thrust force thereby to obtain the braking force. However, since a great speed reduction ratio cannot be achieved by the planetary gear, There is limitation in compactness of the electric motor, and, thus, the fundamental solution cannot be achieved.

Further, in some cases, the speed of the rotation of a motor is decreased by using a worm gear and the rotation is converted into a linear movement by a precise roller-screw mechanism to generate a thrust force thereby to obtain the braking force. In this case, however, since the precise roller-screw mechanism is located perpendicular to the worm gear, the interior of the caliper body cannot be utilized efficiently, with the result that There is limitation in compactness of the caliper body, and, thus, the fundamental solution cannot be achieved.

The present invention is made in consideration of the above-mentioned drawbacks, and an object of the present invention is to provide an electric disc brake in which motor torque can be reduced by incorporating a speed reduction mechanism capable of a great speed reduction ratio without a significant installation space, thereby making a motor and a caliper body more compact.

In the present invention, since the great speed reduction ratio can be obtained, a great brake operating force can be obtained by a small torque of the motor. This means that the number of revolutions of a rotor of the motor becomes relatively high. Accordingly, if pad clearance becomes too great, since it takes a long time for starting the operation of the brake, it is more important that the pad clearance is always kept constant in comparison with the conventional electric disc brakes.

In this regard, conventionally, as a pad wear following mechanism capable of being applied to the electric disc brake, for example, There has been proposed a mechanism by which, in providing a coil spring, and a one-way clutch or a non-reversible screw, a wear following operation is effected by utilizing rotation of a rotor of an electric motor (for example, refer to Japanese Patent Laid-open No. 55-69337 and International Publication No. WO 99/02885).

Further, although various wear following mechanisms capable of being applied to the electric disc brake have been proposed, since an amount of adjustment through one step is small and since a manual operation must be effected when the piston is retracted, exchange of pads becomes troublesome and time-consuming.

Accordingly, another object of the present invention is to provide an electric disc brake having a pad wear adjusting mechanism in which an amount of adjustment through one step can be increased and a piston can be retracted by rotation of a motor.

SUMMARY OF THE INVENTION

To achieve the above objects, according to the present invention, There is provided an electric disc brake in which a caliper body is floatingly supported by a carrier secured to a non-rotating portion of a vehicle, and the caliper body is provided with a piston opposed to one of a pair of brake pads supported by the carrier on both sides of a disc rotor, an electric motor, and a motion converting mechanism for converting rotation of a rotor of the electric motor into a linear movement and for transmitting such movement to the piston. A differential speed reduction mechanism is disposed between the rotor of the electric motor and the motion converting mechanism.

In the present invention, the differential speed reduction mechanism may be interposed between the rotor and the motion converting mechanism along an axial direction of the rotor. In this case, a diameter of the electric motor can be made smaller.

Further, in the present invention, the motion converting mechanism may comprise two rotary members as constructural elements, and the differential speed reduction mechanism may be provided with a gear mechanism for generating a difference in number of revolutions between two rotary members.

In this case, when the motion converting mechanism comprises a ball-ramp mechanism, the two rotary members are constituted by two rotary discs opposed to each other with the interposition of balls, and, when the motion converting mechanism comprises a ball-screw mechanism, the two rotary members are constituted by a nut and a threaded shaft. For a gear mechanism for the former, a combination of two external gears provided in coaxial arrangement with the rotor of the electric motor, and internal gears provided on the two rotary discs of the ball-ramp mechanism, respectively, and meshed with the external gears independently is used. On the other hand, for a gear mechanism for the latter, a combination of two internal gears provided in coaxial arrangement with the rotor of the electric motor, and external gears provided on the nut and the threaded shaft of the ball screw mechanism, respectively, and meshed with the internal gears independently is used. In any case, by the combination of the external gears and the internal gears, the speed of the rotation of the electric motor can be decreased efficiently without excessive installation space.

In the present invention, the motion converting mechanism may comprise one rotary member and one non-rotary member as constructional elements, and the differential speed reduction mechanism may be provided with an eccentric shaft provided on the rotor of the electric motor, and a differential mechanism for transmitting the reduced rotation of the rotor to the rotary member in accordance with rotation of the eccentric shaft.

In this case, the motion converting mechanism may comprise a ball-ramp mechanism in which balls are interposed between the rotary disc and the fixed disc, and the differential mechanism may comprise an eccentric plate rotatably fitted onto the eccentric shaft provided on the rotor, an oldham's mechanism for giving an orbital movement to the eccentric plate in accordance with rotation of the rotor, and a speed reduction device for rotating the rotary disc of the ball-ramp mechanism with a given or fixed rotational ratio with respect to the rotor in response to the orbital movement.

The electric disc brake according to the present invention having the ball-ramp mechanism may be combined with an improved brake pad wear following mechanism. That is to say, an electric disc brake based on one aspect of the present invention is characterized in that a rotor of the electric disc brake is connected to a first disc of a ball-ramp mechanism, a piston is threaded in a second disc via a threaded portion, a spring device is connected between the first and second discs, the piston is advanced or retracted by integrally rotating the first and second discs by a spring force of the spring device, and the piston is retracted or advanced by effecting relative rotation between the first and second discs in opposition to the spring force of the spring device.

With this arrangement, when the disc rotor is not urged by the brake pad, since a great load does not act on the threaded portion to reduce resistance of the threaded portion, upon the rotation of the rotor of the electric motor, the first and second discs are integrally rotated together via the spring force of the spring device, with the result that the piston is shifted by the threaded portion. On the other hand, when the disc rotor is urged by the brake pad, since a great load acts on the threaded portion to increase resistance of the threaded portion, upon the rotation of the rotor of the electric motor, the first and second discs are rotated relative to each other in opposition to the spring force of the spring device, with the result that the piston is driven by the ball-ramp mechanism.

BRIEF DESCRIPTION OF THE DRAWINGS

FIGS. 10A–10E show schematic views representing the operation of the electric disc brake of FIG. 8 when There is no wear of a brake pad;

FIGS. 11A–11F show schematic views representing the operation of the apparatus of FIG. 8 when There is wear of the brake pad;

FIG. 13 is a longitudinal sectional view showing a sixth embodiment of the present invention;

FIGS. 14A–14E show schematic views representing the operation of the electric disc brake of FIG. 13 when There is no wear of a brake pad; and FIGS. 15A–15F show schematic views representing the operation of the electric disc brake of FIG. 13 when There is wear of the brake pad.

DETAILED DESCRIPTION OF THE INVENTION

The present invention will now be fully explained in connection with embodiments thereof with reference to the accompanying drawings.

Figure 1:
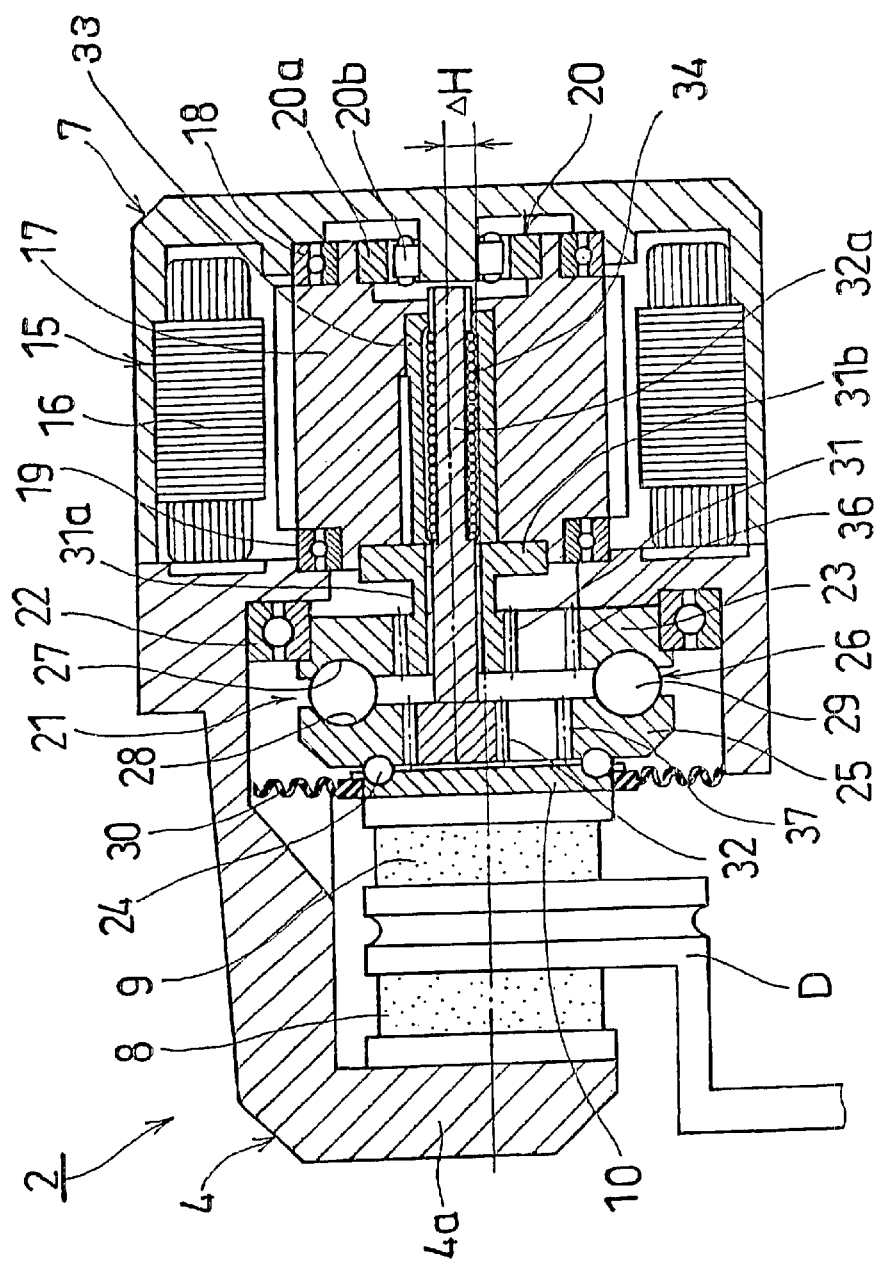
FIG. 1 is a sectional view of an electric disc brake according to a first embodiment of the present invention.
Figure 2:
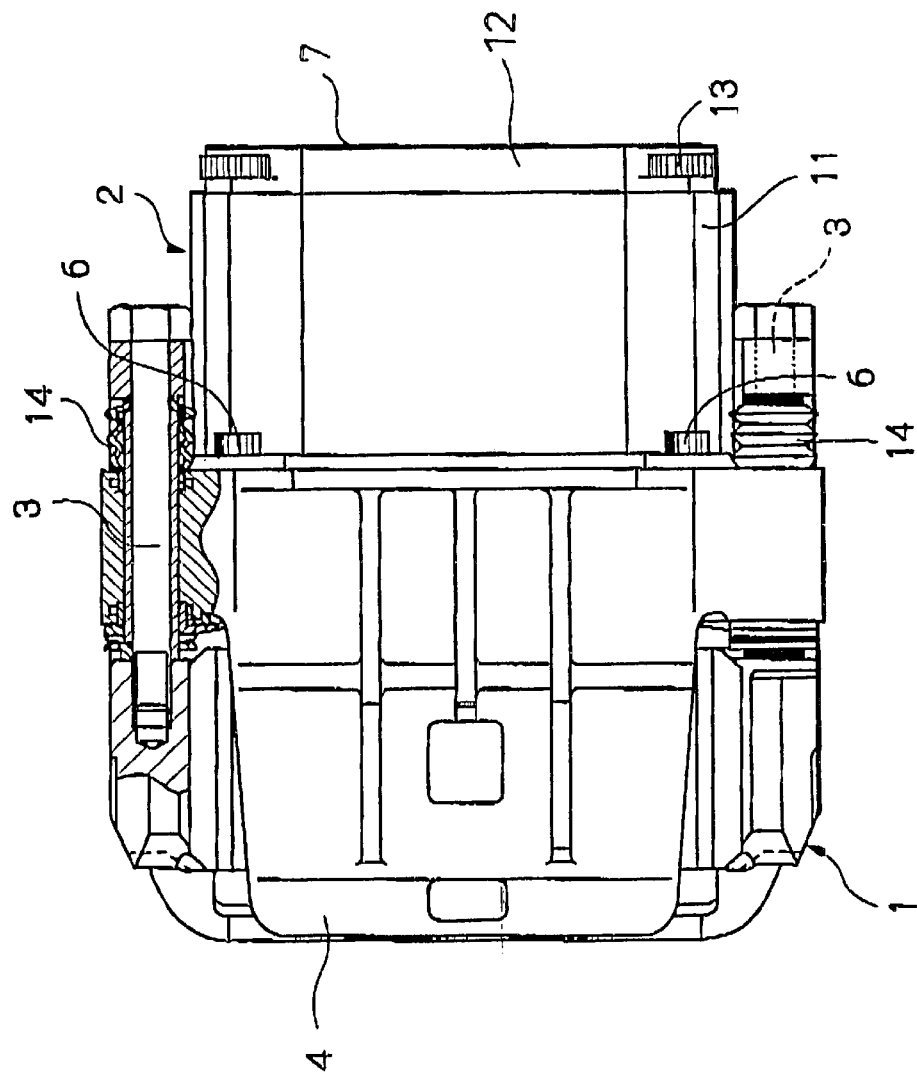
FIG. 2 is a plan view, in partial section, showing an entire construction of the electric disc brake.
Figure 3:
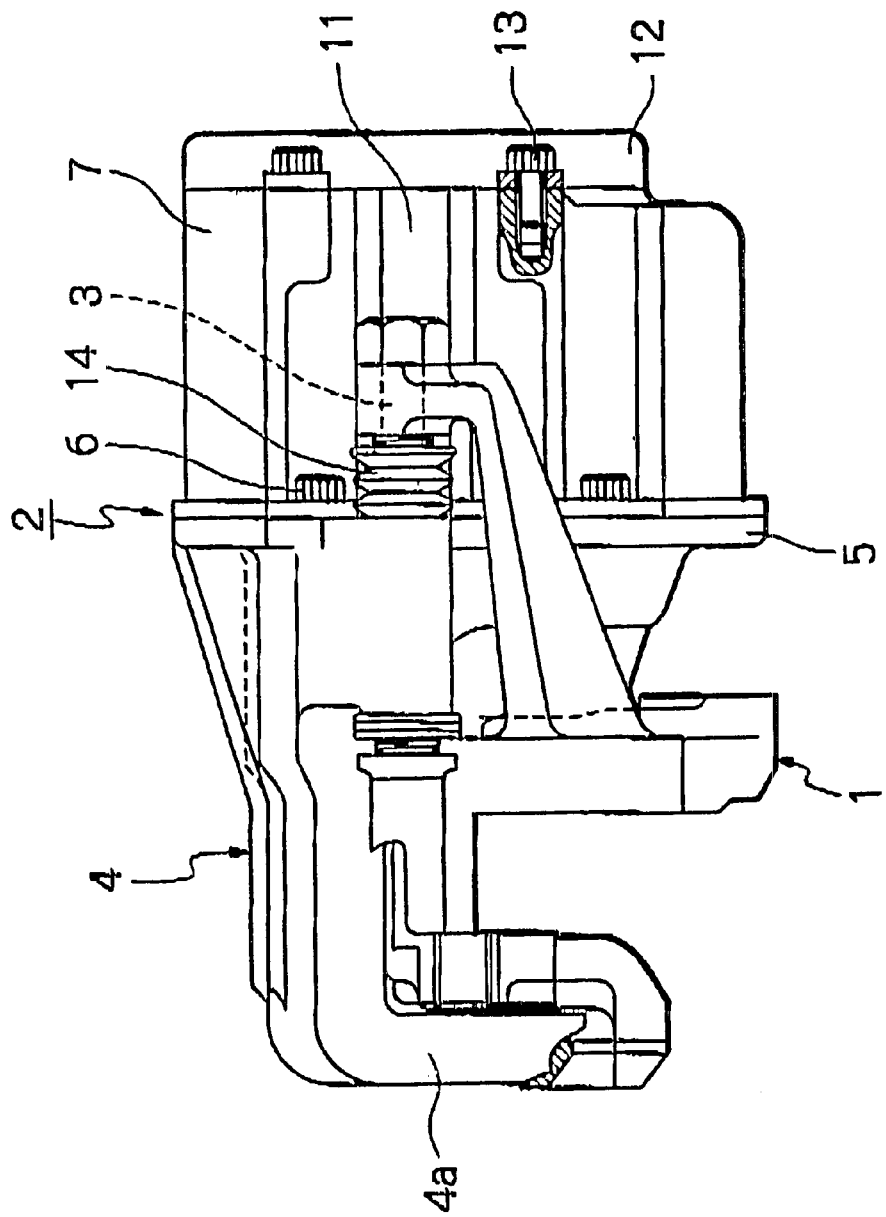
FIG. 3 is a side view showing the entire construction of the electric disc brake.

FIGS. 1 to 3 show an electric disc brake according to a first embodiment of the present invention. In FIGS. 1 to 3, the electric disc brake includes a carrier 1 secured to a non-rotating portion (for example, a knuckle) of a vehicle on the inner side of a disc rotor D, and a caliper body 2 supported by the carrier 1 via left and right slide pins 3 for floating movement in an axial direction of the disc rotor D. The caliper body 2 comprises a substantially C-shaped pawl member 4 straddling the disc rotor D, and a motor case 7 secured to an annular flange portion 5 (FIG. 3) located at a rear end of the pawl member 4 by using bolts 6. A pair of brake pads 8, 9 disposed on both sides of the disc rotor D are supported by the carrier 1 for movement in the axial direction of the disc rotor D. Two pawl pieces 4a of the pawl member 4 of the caliper body 2 can abut against the outer brake pad 8, and a piston 10 (described later) disposed in the caliper body 2 can abut against the inner brake pad 9. The motor case 7 includes a substantially cylindrical case body 11, and a cover 12 secured to a rear end of the case body 11 by bolts 13. Further, exposed portions of the slide pins 3 are covered by boots 14.

An electric motor 15 is disposed in the motor case 7. The electric motor 15 comprises a stator 16 secured to an inner peripheral portion of the motor case 7, and a hollow rotor 17 disposed within the stator 16. The rotor 17 is rotatably supported by the motor case 7 via bearings 18, 19. The electric motor 15 is operated under the control of command from a controller (not shown) so that the rotor 17 is rotated with predetermined torque by a desired angular displacement, and the rotation angle of the rotor 17 is detected by a rotation detecting device 20 comprising a resolver rotor 20a secured to the rotor 17, and a resolver stator 20b secured to the motor case 7. Although not shown, the motor case 7 is provided with a signal line which connects the controller to the stator 16 of the electric motor 15 and the rotation detecting device 20.

On the other hand, in the pawl member 4, There is disposed a ball-ramp mechanism (motion converting mechanism) 21 for converting the rotation of the rotor 17 of the electric motor 15 into a linear movement and for transmitting such linear movement to the piston 10. The ball-ramp mechanism 21 comprises a ring-shaped first disc 23 rotatably supported in the pawl member 4 via a bearing 22, a ring-shaped second disc 25 operatively connected to the piston 10 via a thrust bearing 24, and a rolling mechanism 26 disposed between these discs (rotary discs) 23 and 25. The rolling mechanism 26 includes three arcuate ball grooves 27, 28 respectively formed in opposed surfaces of the first and second discs 23, 25 along a circumferential direction, and balls (steel balls) 29 received between the ball grooves 27 and 28. The ball grooves 27, 28 are inclined in the same direction and equidistantly positioned within a range of an identical included angle (for example, 90 degrees), so that relative rotation between the discs 23, 25 causes three balls 29 to roll in the ball grooves 27, 28, thereby changing a distance between the discs 23 and 25 in accordance with such relative rotation.

The piston 10 is supported by the pawl member 4 of the caliper body 2 in a non-rotating fashion but for axial movement. Further, the piston 10 is always pulled toward the rotor 17 of the electric motor 15 by a spring (not shown), with the result that the balls 29 of the ball-ramp mechanism 21 are forcibly pressurized between the discs 23 and 25. The ball grooves 27, 28 are designed so that, when the first disc 23 is rotated with respect to the second disc 25 in a clockwise direction (viewed from the right in FIG. 1), the second disc 25 is advanced (linearly shifted) to the left in FIG. 1, and the linear shifting movement of the second disc 25 is transmitted to the piston 10 via the thrust bearing 24, with the result that the piston 10 urges the inner brake pad 9 against the disc rotor D. The space where the ball-ramp mechanism 21 is located is shielded from an external environment by means of a cover 30 provided between the piston 10 and the pawl member 4.

The rotor 17 of the electric motor 15 is provided with first and second external gears 31, 32 coaxial with each other. The first external gear 31 is integrally attached to the rotor 17 by securing a flange portion 31b formed on one end of a hollow shaft portion 31a of the gear 31 to a front end of the rotor 17 facing toward the disc rotor D. The second external gear 32 is connected to the rotor 17 in a non-rotating fashion but for axial movement (linear movement) by extending a shaft portion 32a of the gear 32 in and through the shaft portion 31a of the first external gear 31 into the rotor 17 and by fitting the shaft portion 32a, via a ball spline portion 34, in a hollow shaft member 33 fixedly mounted on the rotor and positioned on the center line of the rotor 17.

On the other hand, first and second internal gears 36, 37 adapted to engage with the first and second external gears 31, 32, respectively, are formed on inner surfaces of the first and second discs 23, 25 constituting the ball-ramp mechanism 21. These first and second internal gears 36, 37 have gear diameters sufficiently greater than those of the first and second external gears 31, 32, and, in an assembled condition (to the vehicle), an axis of the electric motor 15 is offset from an axis of the ball-ramp mechanism 21 by an amount $\Delta H$ in a radially outward direction of the disc rotor D, with the result that the first and second external gears 31, 32 are meshed with the first and second internal gears 36, 37, respectively. That is to say, when the rotor 17 of the electric motor 15 is rotated, the first and second external gears 31, 32 are also rotated integrally therewith, with the result that the first and second internal gears 36, 37 are rotated thereby to rotate the first and second discs 23, 25 constituting the ball-ramp mechanism 21 with given rotational ratios with respect to the rotor 17.

When it is assumed that the number of teeth of the first external gear 31 is $N_1$, the number of teeth of the second external gear 32 is $N_2$, the number of teeth of the first internal gear 36 is $n_1$, and the number of teeth of the second internal gear 37 is $n_2$, the first disc 23 is rotated with a rotational ratio of $N_1/n_1 (=A)$ with respect to the rotor 17, and the second disc 25 is rotated with a rotational ratio of $N_2/n_2$ (=B) with respect to the rotor 17. In this case, a reciprocal number of a difference in number of revolutions (angles) between the first and second discs 23 and 25 during one revolution of the rotor 17 represents a speed reduction ratio $\propto$ (=1/(A-B)), thereby creating a differential movement between the discs 23 and 25. Accordingly, the combination of the first external gear 31 and the first internal gear 36 and the combination of the second external gear 32 and the second internal gear 37 are used as a gear mechanism constituting a differential speed reducer. When the rotor 17 rotates by a certain rotational angle $\theta$, a difference $\theta_{A-B}$ in number of revolutions (angles) between the first and second discs 23 and 25 becomes $\theta/\propto$, and, when it is assumed that the inclination (lead) of the ball grooves 27, 28 of the ball-ramp mechanism 21 is L, the second disc 25 is advanced by an amount $\delta\{=(L/360)\times(\theta/\propto)\}$.

Now, an operation of the first embodiment having the above-mentioned construction will be explained.

During a braking operation, when the rotor 17 of the electric motor 15 is rotated with a predetermined torque in the clockwise direction in response to a signal from the controller (not shown), the first and second external gears 31, 32 are rotated, and the differential movement is created between the first and second discs 23 and 25 constituting the ball-ramp mechanism 21 by the internal gears 36, 37 meshed with the external gears 31,32, with the result that the rolling mechanism 26 of the ball-ramp mechanism 21 is operated, thereby advancing the second disc 25. The advancing movement of the second disc 25 is transmitted to the piston 10 through the thrust bearing 24, with the result that the piston 10 urges the brake pad 9 against the inner surface of the disc rotor D and, due to a reaction force thereof, the caliper body 2 is shifted along the slide pins 3, and at the same time, the pawl pieces 4a urge the other brake pad 8 against the outer surface of the disc rotor D, thereby generating a braking force in accordance with the torque of the electric motor 15. In this case, as mentioned above, since the differential movement is created between the first and second discs 23 and 25 constituting the ball-ramp mechanism 21 to sufficiently reduce the rotation of the rotor 17, the torque required for the electric motor 15 can be reduced as significant as possible, thereby making the electric motor 15 and thus the caliper body 2 smaller accordingly.

Further, in this embodiment, since the axis of the electric motor 15 is offset from the axis of the ball-ramp mechanism 21 used as the motion converting mechanism by the amount $\Delta H$ in the radially outward direction of the disc rotor, the axis of the electric motor is displaced in the direction away from a drive shaft of the vehicle, with the result that a motor diameter can be made larger in comparison with a case where these axes are coaxial. Incidentally, when it is assumed that the motor diameter in the coaxial type is D, in this offset type, a motor diameter can be increased to $D+\Delta H\times 2$, thereby reducing power consumption required for obtaining the same torque.

In releasing the braking operation, the rotor 17 of the electric motor 15 is rotated reversely, with the result that the first and second discs 23, 25 are rotated in the reverse directions by the reverse rotations of the first and second external gears 31, 32. Consequently, the difference (differential movement) in number of revolutions is generated between the discs 23 and 25, with the result that the second disc 25 and the piston 10 are retracted and the caliper body 2 is shifted along the slide pins 3 to separate the brake pads 8, 9 from the disc rotor D, thereby releasing the braking force.

Figure 4:
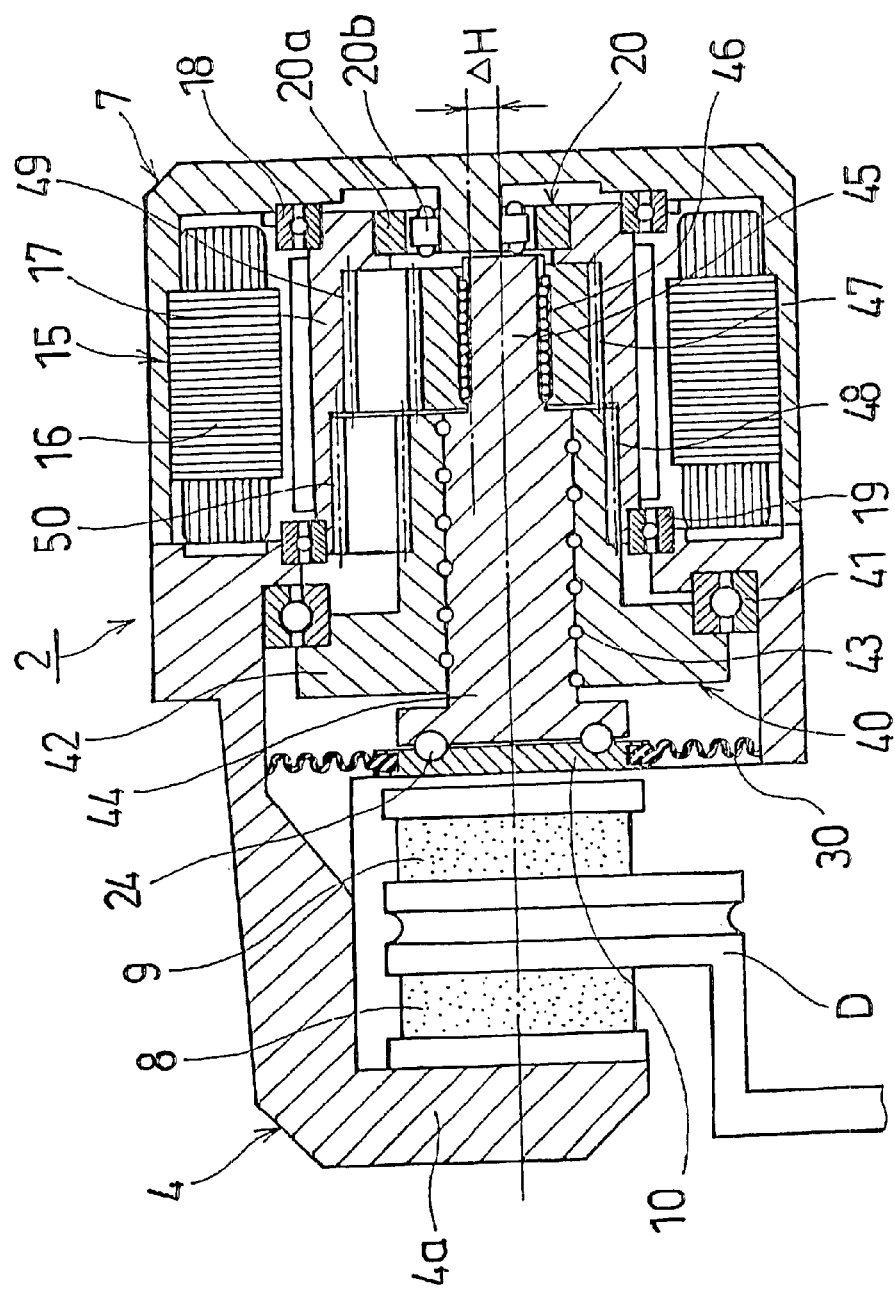
FIG. 4 is a sectional view of an electric disc brake according to a second embodiment of the present invention.

FIG. 4 shows an electric disc brake according to a second embodiment of the present invention. In this second embodiment, in place of the ball-ramp mechanism 21, a ball screw mechanism 40 is used as a motion converting mechanism for converting the rotation of the rotor 17 of the electric motor 15 into the linear movement and for transmitting such linear movement to the piston 10. Since the other portion of the construction is the same as that shown in FIGS. 1 to 3, the same parts or elements are designated by the same reference numerals.

In the second embodiment, the ball-screw mechanism 40 comprises a nut 42 rotatably supported by the pawl member 4 of the caliper body 2 via a bearing 41, and a threaded shaft 44 threadably received in the nut 42 via ball-screw 43. The threaded shaft 44 is rotatable, and a distal end of the shaft is operatively connected to the piston 10 via the thrust bearing 24. The ball screw 43 is designed so that, when the nut 42 is rotated with respect to the threaded shaft 44 in a clockwise direction viewed from the right in FIG. 4, the threaded shaft 44 is advanced (linearly shifted) to the left in FIG. 4. In this case, the linear movement of the threaded shaft 44 is transmitted to the piston 10 through the thrust bearing 24, with the result that the piston 10 is operated to urge the inner brake pad 9 against the disc rotor D.

A small diameter shaft portion 45 is provided at a rear end of the threaded shaft 44, and a first external gear 47 is connected to the small diameter shaft portion 45 via a ball spline portion 46. Further, a second external gear 48 is formed on an outer surface of the nut 42, and first and second internal gears 49, 50 adapted to engage with the first and second external gears 47, 48 independently are formed on an inner surface of the rotor 17 of the electric motor 15. The first and second internal gears 49, 50 have sufficiently greater gear diameters than those of the first and second external gears 47, 48, and, in an assembled condition (to the vehicle), the axis of the electric motor 15 is offset from an axis of the ball-screw mechanism 40 by ΔH in a radially outward direction of the disc rotor D, with the result that the first and second external gears 47, 48 are meshed with the first and second internal gears 49, 50, respectively. That is to say, when the rotor 17 of the electric motor 15 is rotated, the first and second internal gears 49, 50 are also rotated integrally therewith, with the result that the first and second external gears 47, 58 are rotated thereby to rotate the threaded shaft 44 and the nut 42 constituting the ball-screw mechanism 40 with a given rotational ratio with respect to the rotor 17.

When it is assumed that the number of teeth of the first external gear 47 is $N_1$, the number of teeth of the second external gear 48 is $N_2$, the number of teeth of the first internal gear 49 is $n_1$, and the number of teeth of the second internal gear 50 is $n_2$, the threaded shaft 44 is rotated with a rotational ratio of $N_1/n_1$ (=A) with respect to the rotor 17, and the nut 42 is rotated with a rotational ratio of $N_2/n_2(=B)$ with respect to the rotor 17. In this case, a reciprocal number of a difference in number of revolutions (angles) between the threaded shaft 44 and the nut 42 during one revolution of the rotor 17 represents a speed reduction ratio $\propto \{=1/(A-B)\}$, thereby creating a differential movement between the threaded shaft 44 and the nut 42. Accordingly, the combination of the first external gear 47 and the first internal gear 49 and the combination of the second external gear 48 and the second internal gear 50 are used as a gear mechanism constituting a differential speed reducer. When the rotor 17 rotates by a certain rotational angle θ, a difference $\theta_{A-B}$ in number of revolutions (angles) between the threaded shaft 44 and the nut 42 becomes θ/∝, and, when it is assumed that the inclination (lead) of the ball screw 43 of the ball screw mechanism 40 is L, the threaded shaft 44 is advanced by an amount $\delta \{=(L/360)\times(\theta/\propto)\}$.

In the second embodiment, during a braking operation, when the rotor 17 of the electric motor 15 is rotated with a predetermined torque in the clockwise direction in response to a signal from the controller (not shown), the first and second internal gears 49, 50 are rotated, and the differential movement is created between the threaded shaft 44 and the nut 42 constituting the ball screw mechanism 40 by the external gears 47, 48 meshed with the internal gears, with the result that the ball screw 43 is operated, thereby advancing the threaded shaft 44. The advancing movement of the threaded shaft 44 is transmitted to the piston 10 through the thrust bearing 24, with the result that the piston 10 urges the brake pad 9 against the inner surface of the disc rotor D and, due to a reaction force thereof, the caliper body 2 is shifted along the slide pins 3 of the carrier 1 (FIGS. 2 and 3), and at the same time, the pawl pieces 4a urge the other brake pad 8 against the outer surface of the disc rotor D, thereby generating a braking force in accordance with the torque of the electric motor 15. In this case, as mentioned above, like the first embodiment, since the differential movement is created between the nut 42 and the threaded shaft 44 constituting the ball screw mechanism 40 to sufficiently reduce the rotation of the rotor 17 of the electric motor 15, the torque required for the electric motor 15 can be reduced as significant as possible, thereby making the electric motor 15 and thus the caliper body 2 smaller accordingly.

Further, since the axis of the electric motor 15 is offset from the axis of the ball screw mechanism 40 used as the motion converting mechanism by the amount ΔH in the radially outward direction of the disc rotor, like the case in the first embodiment, the axis of the electric motor 15 is displaced in the direction away from a drive shaft of the vehicle, with the result that a motor diameter can be made larger in comparison with a case where these axes are coaxial.

In releasing the braking operation, the rotor 17 of the electric motor 15 is rotated reversely, with the result that the nut 42 and the threaded shaft 44 are rotated in the reverse directions by the reverse rotations of the first and second internal gears 49, 50. Consequently, the difference (differential movement) in number of revolutions is generated between the nut 42 and the threaded shaft 44, with the result that the threaded shaft 44 and the piston 10 are retracted and the caliper body 2 is shifted along the slide pins 3 to separate the brake pads 8, 9 from the disc rotor D, thereby releasing the braking force.

Figure 5:
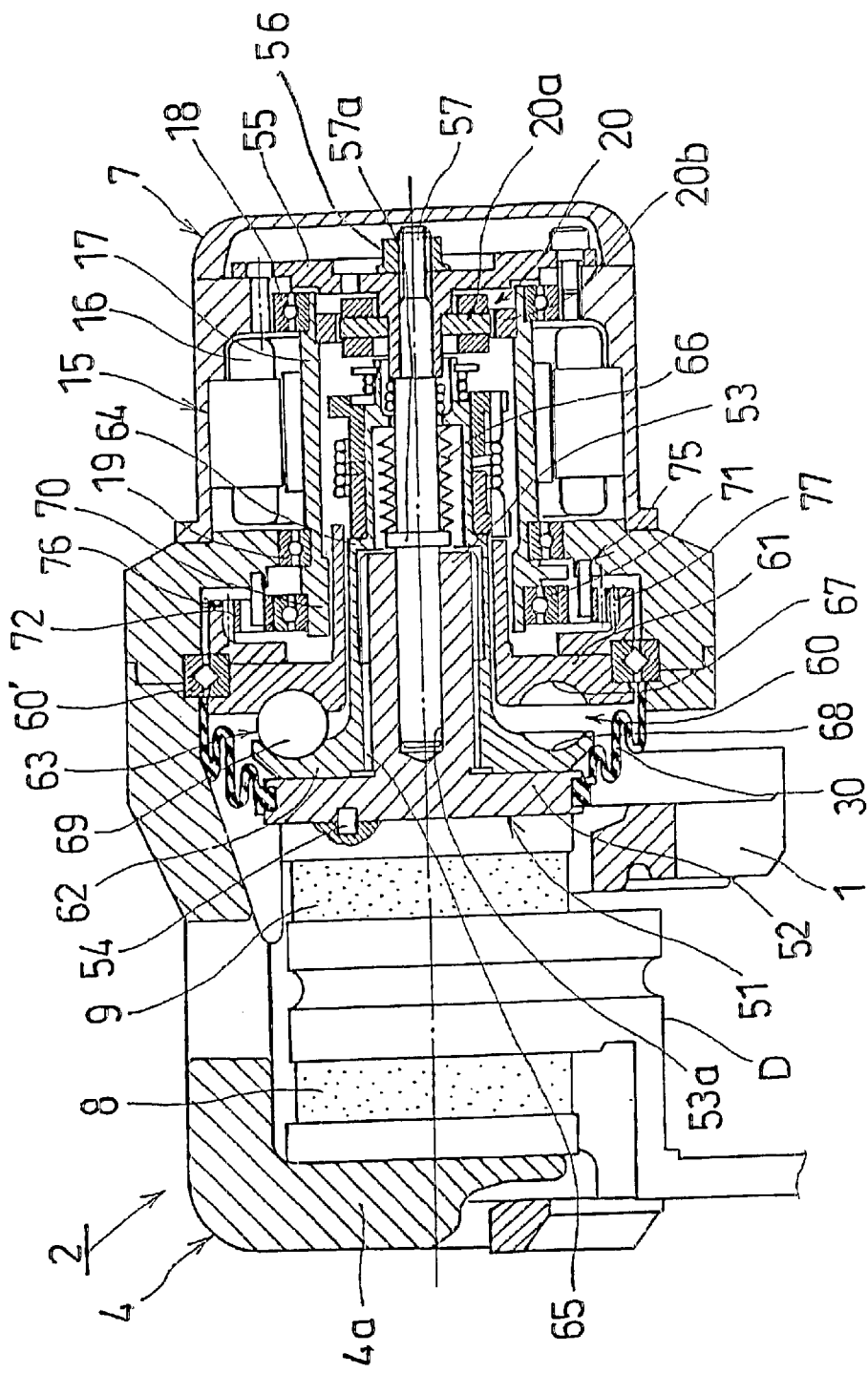
FIG. 5 is a sectional view of an electric disc brake according to a third embodiment of the present invention.

FIG. 5 shows an electric disc brake according to a third embodiment of the present invention. Since the entire construction of the third embodiment is similar to that shown in FIGS. 1 to 3, the same parts or elements are designated by the same reference numerals. In the third embodiment, a piston 51 has a body portion 52 and a shaft portion 53, and the body portion 52 is connected to the inner brake pad 9 in a non-rotating fashion via a rotation preventing pin 54, and the shaft portion 53 is extended into the hollow rotor 17 of the electric motor 15. Further, the shaft portion 53 has a shaft hole 53a into which one end of a rod 57, having the other end secured to a support plate 55 for supporting the resolver stator 20b of the rotation detecting device 20 by a screw 56, is slidably inserted.

A ball-ramp mechanism 60 used as a motion converting mechanism comprises rotary disc 61 rotatably supported by the pawl member 4 of the caliper body 2 via a bearing 60', a fixed disc 62 on the piston side, and a rolling mechanism 63 disposed between the discs 61 and 62. A cylindrical portion 64 inserted in the rotary disc 61 to extend up to the interior of the rotor 17 is integrally formed with the fixed or non-rotation disc 62, and the cylindrical portion 64 is threadably fit on the shaft portion 53 of the piston 51 via a threaded portion 65. Further, a coned disc spring assembly 66 having one end abutting against an intermediate flange portion 57a of the rod 57 is engaged by the cylindrical portion 64 so that the fixed disc 62 is always biased toward the rotary disc 61 (rightward in FIG. 5) by the coned disc spring assembly 66.

Like the rolling mechanism 26 (FIG. 1) in the first embodiment, the rolling mechanism 63 between the discs 61 and 62 comprises three ball grooves 67, 68 formed in opposed surfaces of the respective discs 61, 62 and balls (steel balls) 69 disposed between the ball grooves 67 and 68. Like the case of the rolling mechanism 26, the ball grooves 67 and 68 are inclined in the same direction and equidistantly positioned within a range of an identical included angle (for example, 90 degrees), so that rotation of the rotary disc 61 with respect to the fixed disc 62 causes the three balls 69 to roll in the ball grooves 67, 68. The ball grooves 67, 68 are designed so that, when the rotary disc 61 is rotated with respect to the fixed disc 62 in a clockwise direction viewed from the right in FIG. 5, the fixed disc 62 is advanced (linearly shifted) to the left in FIG. 5. In this case, the threaded portion 65 between the cylindrical portion 64 of the fixed disc 62 and the shaft portion 53 of the piston 51 has considerably great resistance, with the result that the fixed disc 62 is advanced without rotation, and the piston 51 is advanced accordingly, thereby urging the inner brake pad 9 against the disc rotor D.

Figure 6:
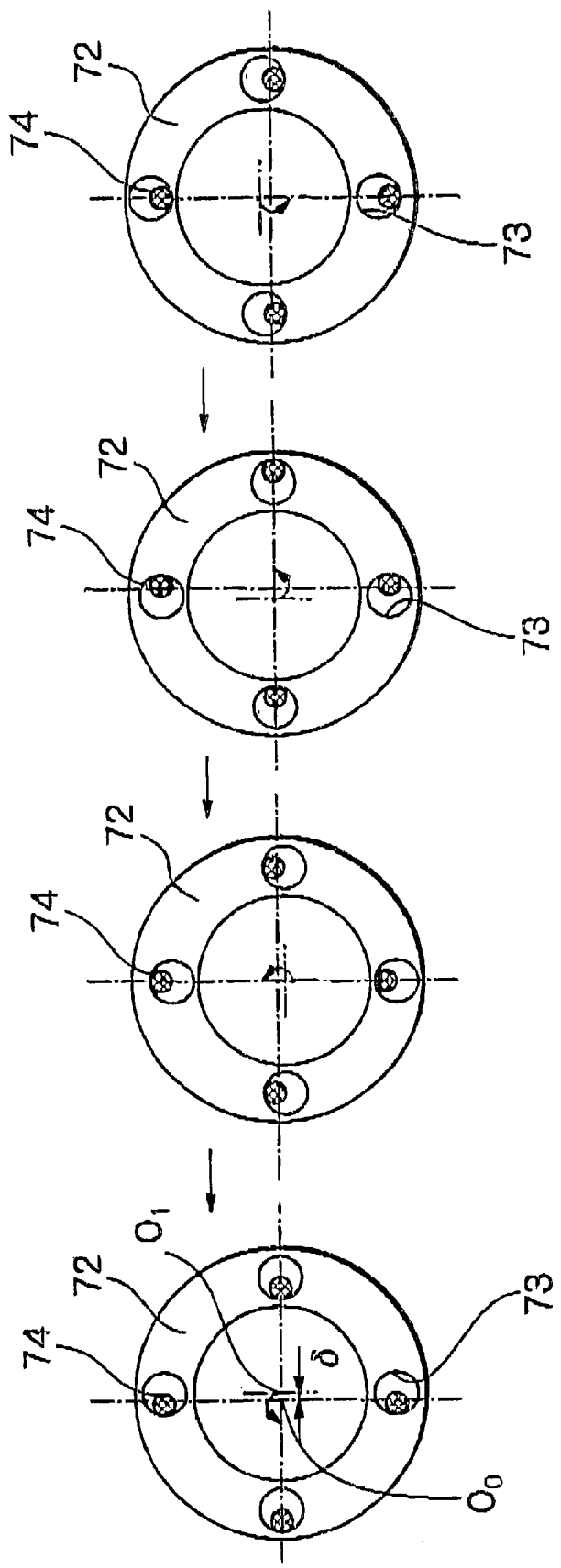
FIG. 6 shows schematic views representing operating conditions of an oldham's mechanism constituting a part of the electric disc brake of FIG. 5.

An eccentric shaft 70 is provided as an extension of the rotor 17 of the electric motor 15 on the side of the disc rotor D, and an eccentric plate 72 is rotatably supported by the eccentric shaft 70 via a bearing 71. Also as shown in FIG. 6, four through-holes 73 equidistantly located in a circumferential direction are formed in the eccentric plate 72, and pins 74 formed on the pawl member 4 are inserted in these through-holes 73. The four through-holes 73 formed in the eccentric plate 72 and the pins 74 constitute an oldham's mechanism 75. Due to the presence of the oldham's mechanism 75, the eccentric plate 72 is subjected to an orbital movement without its own rotation in accordance with the rotation of the eccentric shaft 70. In FIG. 6, the symbol $O_o$ denotes a rotation center of the rotor 17; $O_1$ denotes a center of the eccentric shaft 70; and $\delta$ denotes an eccentric amount between these centers. An external gear 76 is formed on an outer periphery of the eccentric plate 72, and an internal gear 77 meshed with the external gear 76 is formed on the rotary disc 61 of the ball-ramp mechanism 60, so that the rotary disc 61 is rotated with a given rotational ratio with respect to the rotor 17 in accordance with the orbital movement of the eccentric plate 72. That is to say, the eccentric shaft 70, bearing 71, eccentric plate 72, oldham's mechanism 75, external gear 76, internal gear 77 and the like constitute a differential mechanism of a differential speed reducer, and a combination of the external gear 76 and the internal gear 77 constitutes a speed reduction mechanism.

When it is assumed that the number of teeth of the external gear 76 is z and the number of teeth of the internal gear 77 is Z, the rotary disc 61 of the ball-ramp mechanism 60 is rotated with a given rotational ratio of N $\{=(Z-z)/Z\}$ with respect to the rotor 17. In this case, the number of revolutions of the rotor 17 during one revolution of the rotary disc 61 represents a speed reduction ratio $\alpha$ (=1/N). when the rotor 17 is rotated by a certain angle, a rotational angle $\theta A$ of the rotary disc becomes $\theta/\alpha$, and when it is assumed that inclination (lead) of the ball grooves 67, 68 of the ball-ramp mechanism 60 is L, the fixed disc 62 is advanced by an amount of $\delta$ $\{=(L/360)\times(\theta/\alpha)\}$.

In the above-mentioned third embodiment, during a braking operation, when the rotor 17 of the electric motor 15 is rotated with a predetermined torque in the clockwise direction in response to a signal from the controller (not shown), the eccentric shaft 70 integrally formed with the rotor is rotated, and the eccentric plate 72 is subjected to the orbital movement without rotating about its own axis by the oldham's mechanism 75. Due to the orbital movement of the eccentric plate 72, the internal gear 77 is rotated via the external gear 76, and the rotary disc 61 of the ball-ramp mechanism 60 is rotated with the given rotational ratio with respect to the rotor 17. In this case, by the resistance of the threaded portion 65 between the cylindrical portion 64 of the fixed disc 62 and the shaft portion 53 of the piston 51, the fixed disc 62 is advanced without rotation. Consequently, the piston 51 is advanced to urge the inner brake pad 9 against the disc rotor D, and, due to a reaction force thereof, the caliper body 2 is shifted along the slide pins 3 of the carrier 1 (FIGS. 2 and 3), with the result that the pawl pieces 4a urge the other brake pad 8 against the outer surface of the disc rotor D, thereby generating a braking force corresponding to the torque of the electric motor 15. In this way, since the speed of the rotation of the rotor 17 of the electric motor 15 is sufficiently reduced, the torque required for the electric motor 15 can be reduced as significant as possible, thereby making the electric motor 15 and thus the caliper body 2 smaller accordingly.

In releasing the braking operation, when the rotor 17 of the electric motor 15 is rotated reversely, the fixed disc 62 and the piston 51 are integrally retracted by the biasing force of the coned disc spring assembly 66, and, thus, the caliper body 2 is shifted along the slide pins 3, with the result that the brake pads 8, 9 are separated from the disc rotor D, thereby releasing the braking force.

Figure 7A:
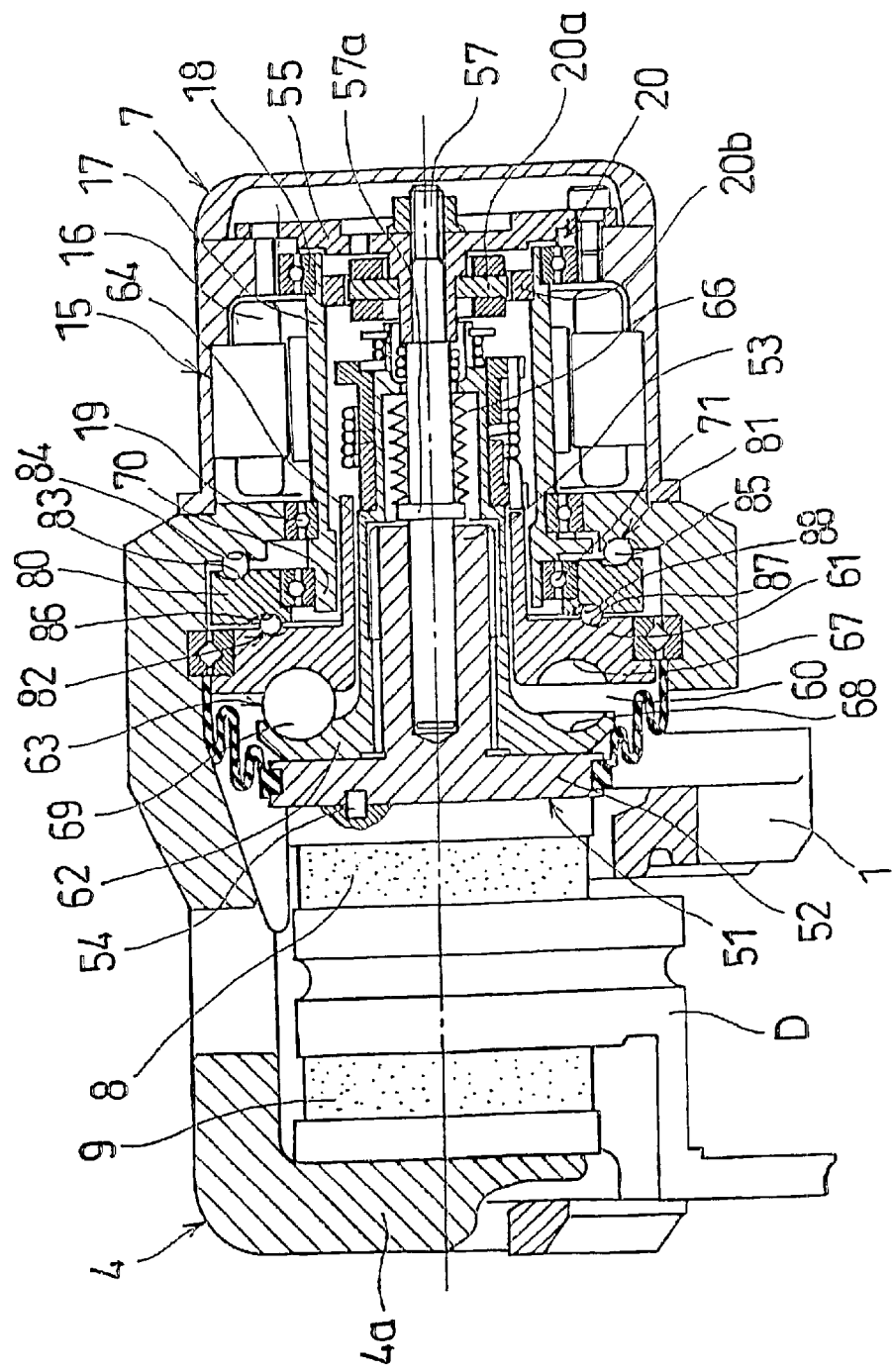
FIG. 7A is a sectional view of an electric disc brake according to a fourth embodiment of the present invention.

FIG. 7A shows an electric disc brake according to a fourth embodiment of the present invention. Since the entire construction of the fourth embodiment is similar to that shown in FIG. 5, the same parts or elements are designated by the same reference numerals. In the fourth embodiment, like the third embodiment, an eccentric plate 80 is rotatably supported by the eccentric shaft 70 integrally formed with the rotor 17 of the electric motor 15 via the bearing 71. Further, in the fourth embodiment, an Oldham's mechanism 81 is disposed between the eccentric plate 80 and the pawl member 4, and a speed reduction mechanism 82 is disposed between the eccentric plate 80 and the rotary disc 61 of the ball-ramp mechanism 60.

Figure 7B:
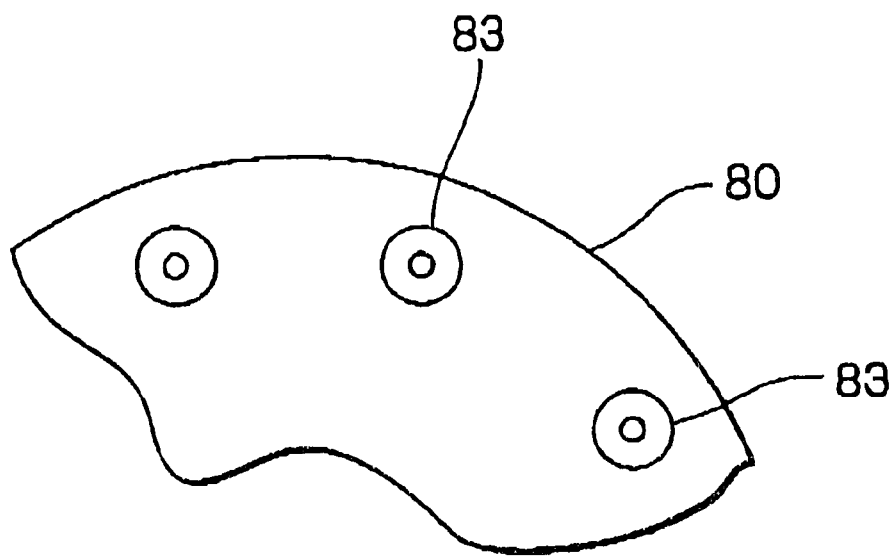
FIG. 7B is a side view showing a part of an eccentric plate shown in FIG. 7A.

AS shown in FIG. 7B, the Oldham's mechanism 81 comprises a plurality of annular recesses 83 having projections at their centers and formed in the eccentric plate 80, and spaced apart from each other in a circumferential direction. Similar annular recesses 84 formed in the pawl member 4, and balls 85 disposed between the respective recesses 83 and 84, and the eccentric plate 80 is subjected to orbital movement without rotation by the operation of the oldham's mechanism 81. The speed reduction mechanism 82 includes a cycloid groove 86 formed in the eccentric plate 80, a cycloid groove 87 formed in the rotary disc 61, and balls 88 disposed between these two cycloid grooves 86 and 87. By operating the speed reduction mechanism 82 in response to the orbital movement of the eccentric plate 80, the rotary disc 61 is rotated with a given rotational ratio with respect to the rotor 17. That is to say, the eccentric shaft 70, bearing 71, eccentric plate 80, oldham's mechanism 81, speed reduction mechanism 82 and the like constitute a differential mechanism of a differential speed reducer. A differential mechanism itself comprised of a combination of such an oldham's mechanism 81 and the cycloid grooves 86, 87 is well-known and is disclosed, for example, in Japanese Patent "KOKOKU" (Publication for inviting pre-grant oppositions) No. Hei 7-62495. The content of this Japanese patent document is hereby incorporated by reference.

When it is assumed that a diameter of a basic circle of the cycloid groove 86 of the eccentric plate 80 is d and a diameter of a basic circle of the cycloid groove 87 of the rotary disc 61 is D, the rotary disc 61 of the ball-ramp mechanism 60 is rotated with a given rotational ratio of N $\{=(D-d)/D\}$ with respect to the rotor 17. In this case, the number of revolutions of the rotor 17 during one revolution of the rotary disc 61 represents a speed reduction ratio $\alpha$ $(=1/N)$. When the rotor 17 is rotated by a certain angle $\theta$, the rotational angle $\theta A$ of the rotary disc 61 becomes $\theta/\alpha$, and, when it is assumed that inclination (lead) of the ball grooves 67, 68 of the ball-ramp mechanism 60 is L, the fixed disc 62 is advanced by an amount of $\delta$ $\{=(L/360)\times(\theta/\alpha)\}$.

In the fourth embodiment, during a braking operation, when the rotor 17 of the electric motor 15 is rotated with predetermined torque in the clockwise direction in response to a signal from the controller (not shown), the eccentric shaft 70 is rotated integrally with the rotor, and the eccentric plate 80 is subjected to the orbital movement without its own rotation by the oldham's mechanism 81. Due to the orbital movement of the eccentric plate 80, the speed reduction mechanism 82 having the balls 88 disposed between the two cycloid grooves 86 and 87 is operated to rotate the rotary disc 61 of the ball-ramp mechanism 60 with the given rotational ratio with respect to the rotor 17. In this case, by the resistance of the threaded portion 65 between the cylindrical portion 64 of the fixed disc 62 and the shaft portion 53 of the piston 51, the fixed disc 62 is advanced without rotation. Consequently, the piston 51 is advanced to urge the inner brake pad 9 against the disc rotor D, and, due to a reaction force thereof, the caliper body 2 is shifted along the slide pins 3 of the carrier 1 (FIGS. 2 and 3), with the result that the pawl pieces 4a urge the other brake pad 8 against the outer surface of the disc rotor D, thereby generating a braking force corresponding to the torque of the electric motor 15. In this way, since the speed of the rotation of the rotor 17 of the electric motor 15 is sufficiently reduced, the torque required for the electric motor 15 can be reduced as significant as possible, thereby making the electric motor 15 and thus the caliper body 2 smaller accordingly.

In releasing the braking operation, when the rotor 17 of the electric motor 15 is rotated reversely, the fixed disc 62 and the piston 51 are integrally retracted by the biasing force of the coned disc spring assembly 66, and, thus, the caliper body 2 is shifted along the slide pins 3, with the result that the brake pads 8, 9 are separated from the disc rotor D, thereby releasing the braking force.

Next, a fifth embodiment of the present invention will be explained with reference to FIGS. 8 to 12.

Figure 8:
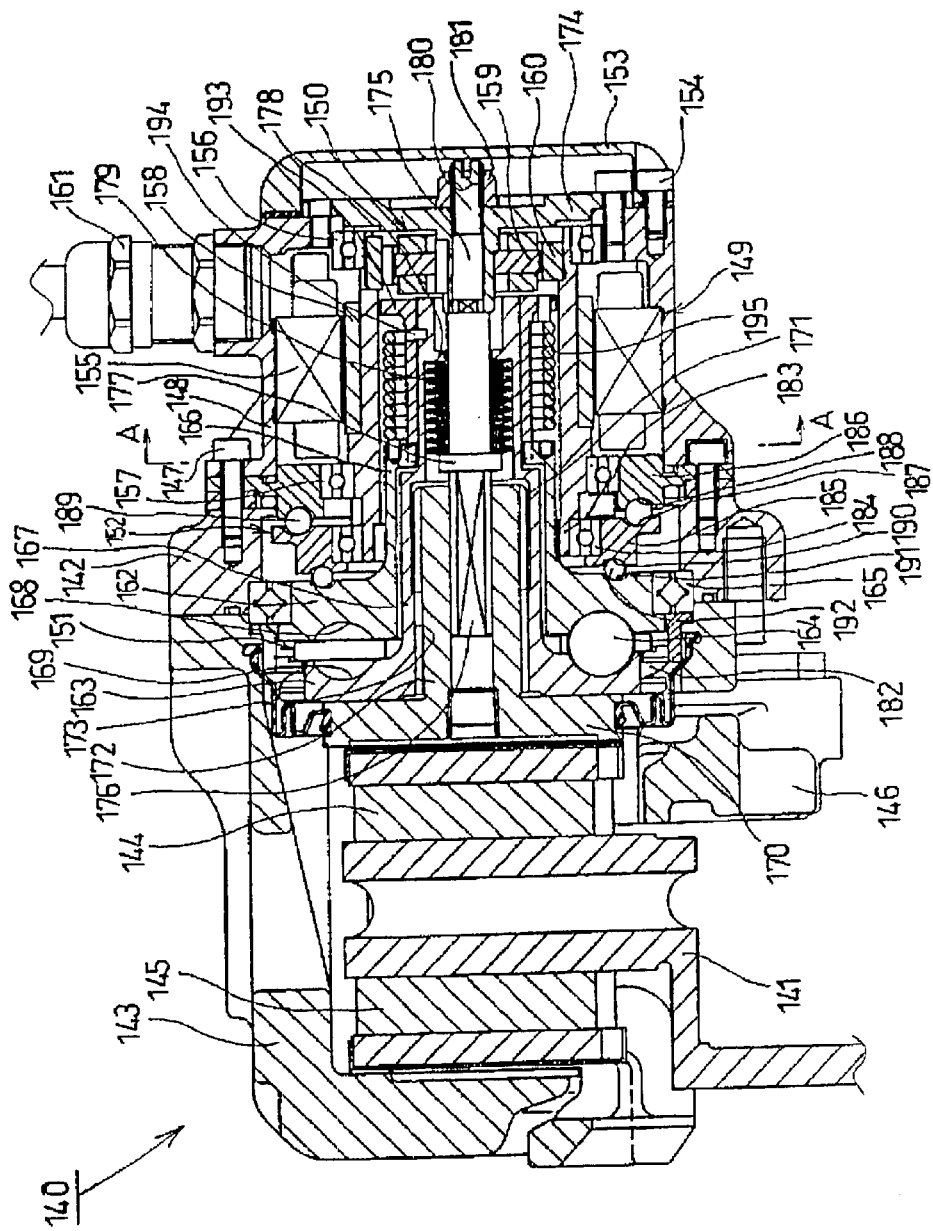
FIG. 8 is a longitudinal sectional view showing a fifth embodiment of the present invention.
Figure 9:
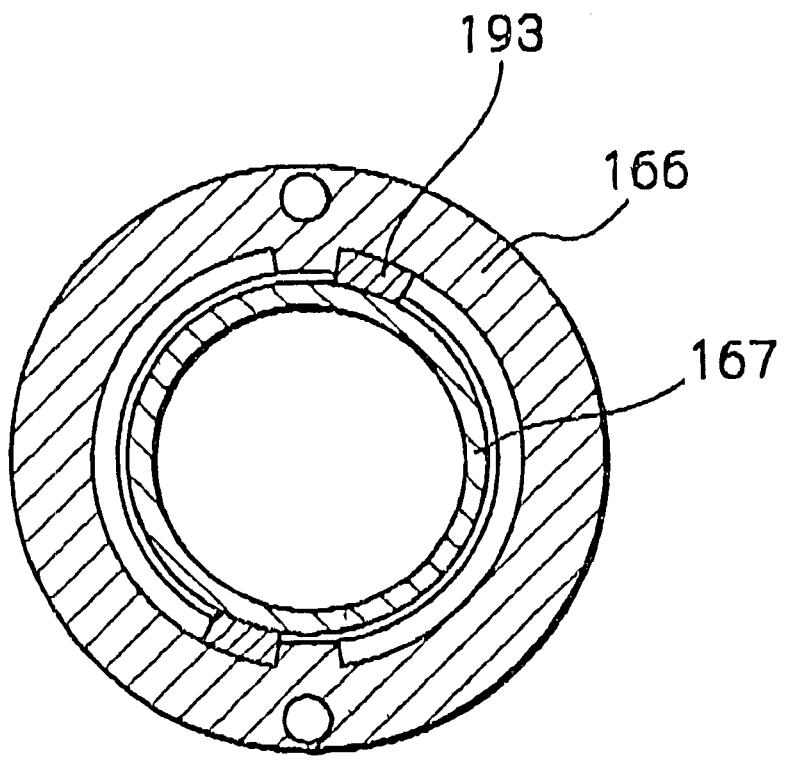
FIG. 9 is a cross sectional view taken along the line A—A in FIG. 8, showing a cylindrical portion, a sleeve and a spring holder.

AS shown in FIGS. 8 and 9, an electric disc brake 140 according to the fifth embodiment comprises a caliper body 142 disposed at one side (normally, inner side with respect to a vehicle body) of a disc rotor 141 rotating together with a vehicle wheel (not shown), and a substantially c-shaped pawl member 143 straddling the disc rotor 141 integrally coupled to the caliper body 142. Brake pads 144, 145 are disposed on both sides of the disc rotor 141, i.e., between the disc rotor 141 and the caliper body 142 and between the disc rotor and a distal end of the pawl member 143, respectively. The brake pads 144, 145 are supported by a carrier 146 secured to the vehicle body for movement along an axial direction of the disc rotor 141, and the carrier 146 receives the braking torque. Further, the caliper body 142 is slidably guided by slide pins (not shown) attached to the carrier 146 along the axial direction of the disc rotor 141.

A substantially cylindrical case 148 is connected to the caliper body 142 by bolts 147, and an electric motor 149 and a rotation detecting device 150 are provided in the case 148. A ball-ramp mechanism 151 and a speed reduction mechanism 152 are disposed in the caliper body 142. A cover 153 is attached to a rear end of the case 148 by bolts 154.

The electric motor 149 comprises a stator 155 secured to an inner peripheral portion of the case 148, and a rotor 158 inserted in the stator 155 and rotatably supported via bearings 156, 157. A rotation detecting device 150 comprises a resolver stator 159 secured to the case 148, and a resolver rotor 160 attached to the rotor 158, so that a rotational position of the rotor 158 is detected by the relative rotation between the resolver stator and the resolver rotor. A controller (not shown) is connected to the electric motor 149 and the rotation detecting device 150 through a connector 161 so that the rotor 158 is rotated with a desired torque and by a desired angle in response to a signal from the controller.

The ball-ramp mechanism 151 comprises annular first and second discs 162, 163, and a plurality of balls (steel balls) 164 disposed between these discs. The first disc 162 is rotatably supported by the caliper body 142 via a bearing 165 and has an integrally formed cylindrical portion 166 which is inserted in the rotor 158. A cylindrical sleeve 167 having a diameter smaller than that of the cylindrical portion 166 is integrally formed with the second disc 163, and the sleeve 167 is inserted in the cylindrical portion 166.

Like the first embodiment, in the ball-ramp mechanism 151, the balls 164 are interposed between ball grooves 168 and 169 formed in the first and second discs 162, 163 and axial relative displacement between the first and second discs 162 and 163 is effected by rolling the balls 164 in the ball grooves 168, 169 by relative rotation between the first and second discs 162 and 163. In this case, when the first disc 162 is rotated with respect to the second disc 163 in a clockwise direction, these discs are displaced to be separated from each other.

A piston 170 is disposed between the second disc 163 and the brake pad 144. A cylindrical portion 172 having a periphery on which a threaded portion 171 is formed is provided on the piston 170. The cylindrical portion 172 is inserted in the sleeve 167 of the second disc 163 to be engaged by a threaded portion 173 formed on an inner periphery of the sleeve. A two-flank-surface portion (having two parallel side surfaces) 176 of a shaft 175 attached to the case 148 via a bracket 174 is fitted in the cylindrical portion 172, thereby supporting the piston 170 in a nonrotating fashion. The threaded portions 171, 173 constitute a non-reversible screw mechanism so that the piston 170 is usually not shifted by an axial force acting thereon but is shifted toward the disc rotor 141 by rotating the second disc 163 in a counter-clockwise direction.

A plurality of coned disc springs (compression springs) 179 are interposed between spring receiving portions 177, 178 formed on an outer peripheral portion of the shaft 175 and an inner peripheral portion of the sleeve 167 of the second disc 163, respectively, so that the second disc 163 is biased by the force of the springs to pinch the balls 164 between the second disc and the first disc. The shaft 175 is attached to the bracket 174 by a screw 180 and a lock nut 181. Further, the rotation of the second disc 163 is subjected to a moderate resistance by an urging force of a wave-shaped washer 182.

Next, the speed reduction mechanism 152 will be explained. An eccentric shaft 183 is formed at one end of the rotor 158 of the electric motor 149, and an eccentric plate 185 is rotatably attached to the outer periphery of the eccentric shaft 183 by a bearing 184. A fixed plate 186 opposed to the eccentric plate 185 is secured to the caliper body 142. A plurality of annular recesses 187, 188 are formed in opposed surfaces of the eccentric plate 185 and the fixed plate 186 along circumferential directions thereof, and balls (steel balls) 189 are interposed between the recesses 187 and 188, thereby constituting an oldham's mechanism for supporting the eccentric plate 185 for orbital movement. One end surface of the eccentric plate 185 is opposed to the first disc 162, and cycloid grooves 190, 191 are provided in such opposed surfaces, and balls (steel balls) 192 are interposed between the cycloid grooves 190 and 191.

A cylindrical spring holder 193 is attached to an outer periphery of a distal end of the sleeve 167 of the second disc 163 by a pin 194 in a non-rotational fashion. One end of the spring holder 193 is engaged by a distal end of the cylindrical portion 166 of the first disc 162 so that the relative rotation therebetween is limited within a certain range. A coil spring (spring device) 195 is mounted around the spring holder 193. The coil spring 195 is twisted with a predetermined set torque (pre-load), and one end of the coil spring is connected to the spring holder 193 and the other end is connected to the cylindrical portion 166 of the first disc 162.

Now, an operation of the fifth embodiment having the above-mentioned construction will be explained.

In a non-braking condition, the balls 164 of the ball-ramp mechanism 151 are located in the deepest ends of the ball grooves 168, 169 so that the first and second discs 162, 163 take the closest positions to each other. During a braking operation, when the rotor 158 of the electric motor 149 is rotated in a clockwise direction, the eccentric plate 185 is revolved (orbital movement), with the result that, under the action of the cycloid grooves 190, 191 and the balls 192, like the fourth embodiment, the first disc 162 is rotated with respect to the rotor 158 in the counter-clockwise direction with speed reduction, thereby increasing the torque accordingly.

The rotational force of the first disc 162 is transmitted to the second disc 163 through the coil spring 195. Before the piston 170 urges the brake pads 144, 145,the piston 170 is substantially not subjected to the axial load. Since resistance generated in the threaded portions 171, 173 between the piston 170 and the second disc 163 is small, the second disc 163 is rotated integrally with the first disc 162 due to the set load (non-load) of the coil spring 195 to generate the relative rotation between the second disc 163 and the piston 170, with the result that the piston 170 is advanced toward the disc rotor 141 under the action of the threaded portions 171, 173. As a result, the piston 170 urges the brake pad 144 against the disc rotor 151, and, due to a reaction force thereof, the pawl member 143 urges the other brake pad 145 against the disc rotor 141.

After the brake pads 144, 145 are urged against the disc rotor 141, since great axial load acts on the piston 170 due to the reaction force, the resistance of the threaded portions 171, 173 is increased to exceed the set load of the coil spring 195, with the result that the coil spring 195 is deformed, thereby generating the relative rotation between the first and second discs 162 and 163. Consequently, the balls 164 roll in the ball grooves 168, 169, thereby advancing the second disc 163, with the result that the piston 170 urges the brake pads 144, 145 against the disc rotor 141.

When the braking force is released, the first disc 162 is rotated in the clockwise direction by rotating the rotor 158 of the electric motor 149 in the counter-clockwise direction, through the speed reduction mechanism 152, with the result that, while the brake pads 144, 145 are still pressed against the disc rotor 141, the first and second discs 162, 163 are rotated relative to each other to retract the second disc 163, and, after the brake pads 144, 145 are separated from the disc rotor 141, the first and second discs 162, 163 are rotated as a unit to further retract the piston 170 under the action of the threaded portions 171, 173.

By monitoring electrical current flowing through the electric motor 149, a point where the urging of the brake pads 144, 145 against the disc rotor 141 is started can be detected. During the braking operation, the relative rotation between the first and second discs 162 and 163 is started from this point. In releasing the braking force, the first and second discs 162, 163 are rotated as a unit from this point. Therefore, by controlling this rotational amount, the piston 170 can be retracted by a predetermined distance corresponding to predetermined pad clearance under the action of the threaded portions 171, 173, thereby always keeping the pad clearance constant.

Next, an operation in a case where There is no wear of the brake pads 144, 145 (including a case where wear adjustment (described later) is effected) will be described with reference to FIGS. 10A–10E. During the braking operation, when the rotor 158 of the electric motor 149 is rotated, the following operations take place. Before the brake pads 144, 145 are urged against the disc rotor 141 (FIG. 10A), the first and second discs 162, 163 are rotated as a unit, thereby advancing the piston 170 under the action of the threaded portions 171, 173. After the piston 170 is advanced by the amount δ corresponding to the pad clearance to urge the brake pads 144, 145 against the disc rotor 141 (FIG. 10B), since the resistance of the threaded portions 171, 173 is increased, the first and second discs 162, 163 are rotated relative to each other to further advance the second disc 163 by the ball-ramp mechanism 151, thereby further urging the brake pads 144, 145 against the disc rotor 141 (FIG. 10C).

In releasing the braking force, when the rotor 158 is rotated, the first and second discs 162, 163 are rotated relative to each other until the brake pads 144, 145 are separated from the disc rotor 141, with the result that the second disc 163 is retracted by the ball-ramp mechanism 151 (FIG. 10D). Thereafter, by rotating the rotor 158 by the given angle corresponding to the pad clearance ∂, the first and second discs 162, 163 are rotated as a unit, thereby retracting the piston 170 by the amount corresponding to the pad clearance a under the action of the threaded portions 171, 173 (FIG. 10E). In this way, the given pad clearance can always be maintained.

Next, the case where the wear of the brake pads 144, 145 is adjusted will be described with reference to FIGS. 11A–11F. When the braking operation is started and the rotor 158 of the electric motor 149 is rotated, the following operations take place. Before the brake pads 144, 145 are urged against the disc rotor 141, the first and second discs 162, 163 are rotated as a unit, thereby advancing the piston 170 under the action of the threaded portions 171, 173 (FIG. 11A). In this case, even if the piston 170 is advanced by the amount corresponding to the pad clearance ∂, these pads are not urged against the disc rotor 141 since the brake pads 144, 145 have worn (FIG. 11B). When the first and second discs 162, 163 are further rotated as a unit to advance the piston 170 by an amount corresponding to the wear amount, the brake pads 144, 145 are urged against the disc rotor 141 (FIG. 11C). After the brake pads 144, 145 are urged against the disc rotor 141, since the resistance of the threaded portions 171, 173 is increased, the first and second discs 162, 163 are rotated relative to each other to advance the second disc 163 by the ball-ramp mechanism 151, thereby further urging the brake pads 144, 145 against the disc rotor 141 (FIG. 11D).

In releasing the braking force, when the rotor 158 is rotated, the first and second discs 162, 163 are rotated relative to each other until the brake pads 144, 145 are separated from the disc rotor 141, with the result that the second disc 163 is retracted by the ball-ramp mechanism 151 (FIG. 11E). Thereafter, by rotating the rotor 158 by the given angle corresponding to the pad clearance δ, the first and second discs 162, 163 are rotated as a unit, thereby retracting the piston 170 by the amount corresponding to the pad clearances under the action of the threaded portions 171, 173 (FIG. 11F).

In this way, regardless of the wear amount of the brake pads 144, 145, the piston 170 can follow the wear of the brake pads 144, 145 by the single operation shown in FIGS. 11A–11C, with the result that the given pad clearance can always be maintained.

Figure 12A:
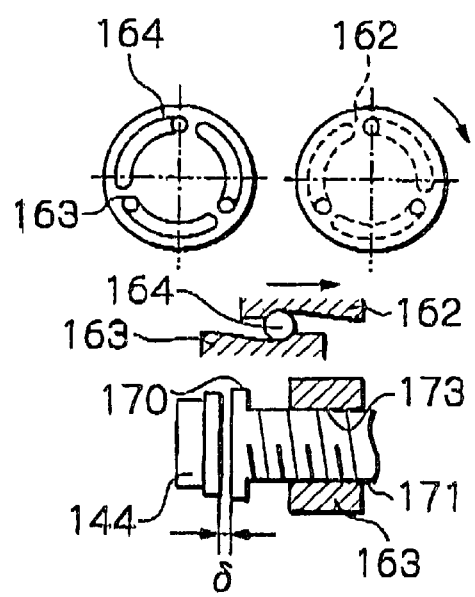
FIGS. 12A–12B show schematic views representing the operation for retracting a piston upon replacement of the brake pad in the electric disc brakes of FIG. 8 and FIG. 13.
Figure 12B:
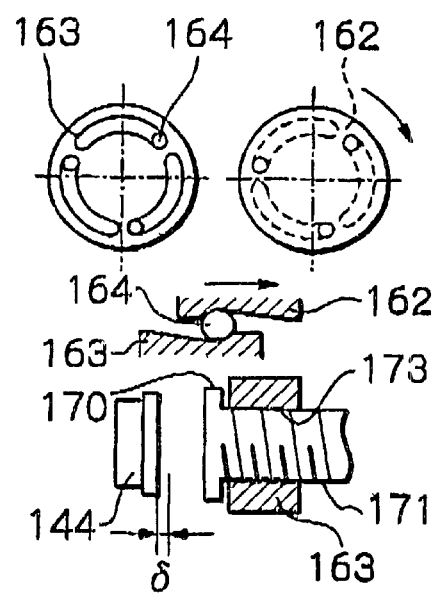

Next, a case where the piston 170 should be retracted for replacement of the brake pads 144, 145 will be explained with reference to FIGS. 12A and 12B. FIG. 12A shows the non-braking condition. When the first disc 162 is rotated in the clockwise direction by the electric motor 149, since the balls 164 of the ball-ramp mechanism 151 are positioned in the deepest ends of the ball grooves 168, 169 and no load acts on the threaded portions 171, 173, the first and second discs 162, 163 are rotated as a unit to retract the piston 170 under the action of the threaded portions 171, 173, as shown in FIG. 12B. In this way, the piston 170 can easily be retracted by the rotation of the rotor 158 of the electric motor 149.

After replacing the brake pads 144, 145 with new ones and effecting the braking action, the predetermined pad clearance can be obtained quickly by the single adjusting operation in a manner like the above-mentioned wear adjustment.

Next, a sixth embodiment of the present invention will be explained with reference to FIGS. 13 to 15F. In the sixth embodiment, since the construction other than a pad wear adjusting mechanism is generally the same as that in the fifth embodiment, elements or parts similar to those in the fifth embodiment are designated by the same reference numerals, and only differences will be fully explained.

As shown in FIG. 13, in an electric disc brake 200 according to the sixth embodiment, a cylindrical limiter 201 is disposed between the spring holder 193 and the coil spring 195 and the cylindrical portion 166 of the first disc. The coil spring 195 is mounted around the spring holder 193 and the limiter 201, and the coil spring 195 is twisted with a predetermined set torque (pre-load), and one end of the coil spring is connected to the spring holder 193 and the other end is connected to the limiter 201. The limiter 201 is engaged by a distal end of the cylindrical portion 166 of the first disc 162 for relative rotation by a predetermined angle corresponding to the pad clearance.

Next, an operation of the sixth embodiment having the above-mentioned construction will be explained with reference to FIGS. 14A–14E, 15A–15F and 12A–12B.

Now, an operation in a case where There is no wear of the brake pads 144, 145 (including a case where wear adjustment (described later) is effected) will be described with reference to FIGS. 14A–14E. During the braking operation, when the first disc 162 is rotated by the rotation of the rotor 158 of the electric motor 149, the following operations take place. Before the brake pads 144, 145 are urged against the disc rotor 141 (corresponding to the pad clearance), since the rotational force of the first disc 162 is not transmitted to the second disc 163 due to relative rotation between the first disc 162 and the limiter 201, the first and second discs 162, 163 are rotated relative to each other, thereby advancing the piston 170 toward the disc rotor 141 (FIG. 14A). After the piston 170 is advanced by the amount δ corresponding to the pad clearance to urge the brake pads 144, 145 against the disc rotor 141 (FIG. 14B), the limiter 201 transmits the rotational force of the first disc 162 to the second disc 163 through the coil spring 195. However, since the resistance of the threaded portions 171, 173 has been increased, the coil spring 195 is deformed and the first and second discs 162, 163 are rotated relative to each other to advance the second disc 163 by the ball-ramp-mechanism 151, thereby further urging the brake pads 144, 145 against the disc rotor 141 (FIG. 14C).

In releasing the braking force, when the rotor 158 is rotated, the first and second discs 162, 163 are rotated relative to each other by the spring force of the coned disc springs 179, thereby retracting the piston 170 until the brake pads 144, 145 are separated from the disc rotor 141 (FIG. 14D). Thereafter, by further rotating the rotor 158 by the given angle corresponding to the pad clearance δ, the first disc 162 is rotated with respect to the limiter 201, thereby retracting the piston 170 by the amount corresponding to the pad clearance δ (FIG. 14E). In this way, the given pad clearance can always be maintained.

Next, the case where the wear of the brake pads 144, 145 is adjusted will be described with reference to FIGS. 15A–15F. When the braking operation is started and the first disc 162 is rotated by the rotation of the rotor 158 of the electric motor 149, the following operations take place. Before the brake pads 144, 145 are urged against the disc rotor 141, since the rotational force of the first disc 162 is not transmitted to the second disc 163 due to the relative rotation between the first disc 162 and the limiter 201, the first and second discs 162, 163 are rotated relative to each other, thereby advancing the piston 170 toward the disc rotor 141 (FIG. 15A). In this case, even if the piston 170 is advanced by the amount corresponding to the pad clearance δ, since the brake pads 144, 145 are worn, these pads are not urged against the disc rotor 141 (FIG. 15B).

When the first disc 162 is further rotated, the limiter 201 transmits the rotational force of the first disc to the second disc 163 through the coil spring 195. However, since the brake pads 144, 145 are not urged against the disc rotor 141 and significant load does not act on the threaded portions 171, 173, the first and second discs 162, 163 are rotated as a unit through the coil spring 195. As a result, the piston 170 is advanced under the action of the threaded portions 171, 173. When the piston 170 is advanced by the amount corresponding to the wear amount, the brake pads 144, 145 are urged against the disc rotor 141 (FIG. 15C). After the brake pads 144, 145 are urged against the disc rotor 141, since the resistance of the threaded portions 171, 173 is increased, the coil spring 195 is deformed and the first and second discs 162, 163 are rotated relative to each other, with the result that the second disc 163 is advanced, thereby further urging the brake pads 144, 145 against the disc rotor 141 (FIG. 15D).

In releasing the braking force, when the rotor 158 is rotated, the first and second discs 162, 163 are rotated relative to each other by the spring force of the coned disc spring 179, thereby retracting the piston 170 until the brake pads 144, 145 are separated from the disc rotor 141 (FIG. 15E). Thereafter, by further rotating the rotor 158 by the given angle corresponding to the pad clearance δ, the first disc 162 is rotated with respect to the limiter 201, thereby retracting the piston 170 by the amount corresponding to the pad clearance δ (FIG. 15F).

In this way, regardless of the wear amount of the brake pads 144, 145, the piston 170 can follow the wear of the brake pads 144, 145 by the single operation shown in FIGS. 15A–15C, with the result that the given pad clearance can always be maintained.

Next, a case where the piston 170 should be retracted for replacement of the brake pads 144, 145 will be explained. Reference is made to FIG. 12A illustrating the non-braking condition as is the case in the fifth embodiment. when the first disc 162 is rotated in the clockwise direction by the electric motor 149, since the balls 164 of the ball-ramp mechanism 151 are positioned in the deepest ends of the ball grooves 168, 169 and no load acts on the threaded portions 171, 173, the first and second discs 162, 163 are rotated as a unit to retract the piston 170 under the action of the threaded portions 171, 173, as shown in FIG. 12B. In this way, the piston 170 can easily be retracted by the rotation of the rotor 158 of the electric motor 149.

After replacing the brake pads 144, 145 with new ones and effecting the braking action, the predetermined pad clearance can be obtained quickly by the single adjusting operation in a manner like the above-mentioned wear adjustment.

What is claimed is:

1. An electric brake for use with a vehicle having a disc rotor, comprising:
   a carrier to be secured to a non-rotating part of the vehicle;
   a caliper body floatingly supported by said carrier for movement in a direction parallel with an axis of the disc rotor; and
   two brake pads supported by said carrier to be disposed on respective sides of the disc rotor,
   wherein said caliper body includes:
      (i) a piston provided to face one of said two brake pads;
      (ii) an electric motor having a stator and a rotor radially inside said stator;
      (iii) a differential speed reduction mechanism having an input portion connected to said rotor of said electric motor, an output portion, and a speed reduction device between said input portion and said output portion; and
      (iv) a motion converting mechanism for converting rotation of said rotor of said electric motor into linear movement and transmitting the linear movement to said piston, said motion converting mechanism having a rotatable portion connected to said output portion of said differential speed reduction mechanism, a linearly moveable portion which is to transmit the linear motion to said piston, and a ball-ramp mechanism between said rotatable portion and said linearly moveable portion,
   wherein said stator, said speed reduction device and said motion converting device are arranged in an axial direction of said rotor of said electric motor, with said speed reduction device disposed between said stator and said motion converting device.

2. The electric disc brake according to claim 1, wherein said motion converting mechanism includes two rotary members, and said differential speed reduction mechanism includes a gear mechanism for generating a difference in the number of revolutions between said two rotary members.

3. The electric brake according to claim 1, wherein said motion converting mechanism includes a rotary member and a non-rotary member, said input portion of said differential speed reduction mechanism includes an eccentric shaft provided on said rotor of said electric motor, and said differential speed reduction mechanism further has a differential mechanism for transmitting a reduced rotation of said rotor of said electric motor to said rotary member through rotation of said eccentric shaft.

4. The electric disc brake according to claim 3, wherein:
   said rotary member comprises a rotary disc and said non-rotary member comprises a non-rotary disc;
   said ball-ramp mechanism includes said rotary disc, said non-rotating disc, and balls disposed between said rotary disc and said non-rotary disc;
   said differential mechanism comprises an eccentric plate rotatably fit on said eccentric shaft, and an Oldham's mechanism for providing orbital movement of said eccentric plate in response to rotation of said rotor of said electric motor; and
   said speed reduction device is for rotating said rotary disc with a given rotational ratio with respect to said rotor of said electric motor in response to the orbital movement of said eccentric plate.

5. The electric brake according to claim 1, further comprising a mechanism for maintaining constant a pad clearance between said piston and said one of said two brake pads, wherein:
   said piston is mounted for axial movement while rotation thereof is prevented, and said piston has a cylindrical portion; and
   said ball-ramp mechanism includes a first rotary disc drivably connected to said differential speed reduction mechanism, a second rotary disc having a sleeve portion fit on said cylindrical portion of said piston with threaded portions therebetween, and balls disposed between said first rotary disc and said second rotary disc.

6. The electric brake according to claim 5, wherein said mechanism for maintaining constant the pad clearance includes:
   a spring disposed between said first rotary disc and said second rotary disc so as to impart a pre-load to said first and second rotary discs so that said first and second rotary discs rotate together upon a braking operation to advance said piston through said threaded portions until a resistance created by said threaded portions reaches a predetermined value; and
   a control unit for detecting the predetermined value and determining an amount of rotation of said rotor of said electric motor after detection of the predetermined value during a braking release operation.

7. The electric brake according to claim 6, further comprising a cylindrical limiter disposed between said first rotary disc and said spring so that said first rotary disc is able to rotate without substantial resistance relative to said second rotary disc during an initial angular movement of a predetermined extent during the braking operation.

8. An electric brake for use with a vehicle having a disc rotor, comprising:

a carrier to be secured to a non-rotating part of the vehicle;

a caliper body floatingly supported by said carrier for movement in a direction parallel with the axis of said disc rotor; and two brake pads supported by said carrier and disposed on respective sides of the disc rotor, wherein said caliper body includes:
(i) a piston provided to face one of said two brake pads;
(ii) an electric motor having a rotor;
(iii) a motion converting mechanism for converting rotation of said rotor of said electric motor into a linear movement and transmitting the linear movement to said piston; and
(iv) a differential speed reduction mechanism disposed between said rotor of said electric motor and said motion converting mechanism, wherein said motion converting mechanism includes a rotary member and a non-rotary member, and said differential speed reduction mechanism includes an eccentric shaft provided on said rotor of said electric motor and a differential mechanism for transmitting a reduced rotation of said rotor of said electric motor to said rotary member through rotation of said eccentric shaft.

9. The electric disc brake according to claim 8, wherein:

said rotary member comprises a rotary disc and said non-rotary member comprises a non-rotary disc;

said motion converting mechanism comprises a ball-ramp mechanism including said rotary disc, said non-rotating disc, and balls disposed between said rotary disc and said non-rotary disc; and said differential mechanism comprises an eccentric plate rotatably fit on said eccentric shaft, an Oldham's mechanism for providing orbital movement of said eccentric plate in response to rotation of said rotor of said electric motor, and a speed reduction device for rotating said rotary disc with a given rotational ratio with respect to said rotor of said electric motor in response to the orbital movement of said eccentric plate.

10. An electric brake for use with a vehicle having a disc rotor, comprising:

a carrier to be secured to a non-rotating part of the vehicle;

two brake pads supported by said carrier and disposed on respective sides of the disc rotor;

a caliper body floatingly supported by said carrier for movement in a direction parallel with the axis of said disc rotor, wherein said caliper body includes:
(i) a piston provided to face one of said two brake pads;
(ii) an electric motor having a rotor;
(iii) a motion converting mechanism for converting rotation of said rotor of said electric motor into a linear movement and transmitting the linear movement to said piston; and
(iv) a differential speed reduction mechanism disposed between said rotor of said electric motor and said motion converting mechanism; and a mechanism for maintaining constant a pad clearance between said piston and said one of said two brake pads;

wherein said piston is mounted for axial movement while rotation thereof is prevented, and said piston has a cylindrical portion, and wherein said motion converting mechanism comprises a ball-ramp mechanism including a first rotary disc drivably connected to said differential speed reduction mechanism, a second rotary disc having a sleeve portion fit on said cylindrical portion of said piston with threaded portions therebetween, and balls disposed between said first rotary disc and said second rotary disc.

11. The electric brake according to claim 10, wherein said mechanism for maintaining constant the pad clearance includes:

a spring disposed between said first rotary disc and said second rotary disc so as to impart a pre-load to said first and second rotary discs so that said first and second rotary discs rotate together upon a braking operation to advance said piston through said threaded portions until a resistance created by said threaded portions reaches a predetermined value; and a control unit for detecting the predetermined value and determining an amount of rotation of said rotor of said electric motor after detection of the predetermined value during a braking release operation.

12. The electric brake according to claim 11, further comprising a cylindrical limiter disposed between said first rotary disc and said spring so that said first rotary disc is able to rotate without substantial resistance relative to said second rotary disc during an initial angular movement of a predetermined extent during the braking operation.

* * * * *